(12) United States Patent
Andersson et al.

(10) Patent No.: US 7,000,595 B2
(45) Date of Patent: Feb. 21, 2006

(54) IGNITION TIMING CONTROL SYSTEM FOR LIGHT DUTY COMBUSTION ENGINES

(75) Inventors: Martin N. Andersson, Caro, MI (US); Kevin P. Born, Cass City, MI (US); George M. Pattullo, Caro, MI (US); Eric G. Zbytowski, Caro, MI (US)

(73) Assignee: Walbro Engine Management, L.L.C, Tucson, AZ (US)

( * ) Notice: Subject to any disclaimer, the term of this patent is extended or adjusted under 35 U.S.C. 154(b) by 34 days.

(21) Appl. No.: 10/765,415

(22) Filed: Jan. 27, 2004

(65) Prior Publication Data

US 2004/0182366 A1    Sep. 23, 2004

Related U.S. Application Data

(63) Continuation-in-part of application No. 10/186,522, filed on Jul. 1, 2002, now abandoned.

(60) Provisional application No. 60/306,381, filed on Jul. 18, 2001.

(51) Int. Cl.
*F02P 5/00*    (2006.01)

(52) U.S. Cl. .................. 123/406.47; 123/478; 123/480; 123/406.57; 701/103; 701/110

(58) Field of Classification Search ........... 123/406.45, 123/406.46, 406.47, 406.5, 406.51, 406.57, 123/406.59, 438, 478, 480, 491; 701/103, 701/110

See application file for complete search history.

(56) References Cited

U.S. PATENT DOCUMENTS 3,861,366 A  *  1/1975  Masaki et al. ............... 123/438
5,191,531 A  *  3/1993  Kurosu et al. .............. 701/103

* cited by examiner

*Primary Examiner*—Tony M. Argenbright
*Assistant Examiner*—Johnny H. Hoang
(74) *Attorney, Agent, or Firm*—Reising, Ethington, Barnes, Kisselle, P.C.

(57) ABSTRACT

A control system for a low cost, light duty combustion engine, where the control system generally utilizes engine speed and/or temperature input signals and independent operating sequences to determine a desired ignition timing and air-to-fuel ratio for a combustible mixture. There are several independent operating sequences, each one of which is designed to optimally control the engine under certain conditions. These operating sequences include a Cranking sequence that commences after the engine is initially turned on, a Warm Up sequence which follows the Cranking sequence, a Normal Mode sequence for typical operating conditions, an Acceleration sequence for certain increases in engine speed, a Come Down sequence for when a sufficient engine speed is followed by a certain decrease in speed, and a Recovery Bump sequence for when the engine speed dips below a predetermined level.

36 Claims, 14 Drawing Sheets

IGNITION TIMING CONTROL SYSTEM FOR LIGHT DUTY COMBUSTION ENGINES

REFERENCE TO RELATED APPLICATION

This application is a continuation-in-part of U.S. application Ser. No. 10/186,522, filed Jul. 1, 2002 now Abandoned, both of which claim the benefit of provisional application, Ser. No. 60/306,381, filed Jul. 18, 2001.

FIELD OF THE INVENTION

The present invention relates generally to an ignition timing and air-to-fuel ratio control system for a low cost, light duty combustion engine. More specifically, the present invention relates to a system that controls the spark advance or retard, and the air-to-fuel ratio of a combustible mixture based upon an independent operating sequence selected according to the speed of the engine.

BACKGROUND OF THE INVENTION

Various independent electronic ignition timing control systems and electronic air-to-fuel ratio control systems are known and used in the art.

Ignition timing, also referred to as spark timing, is an important aspect in the performance of internal combustion engines and has been widely utilized over the years. Generally, ignition timing relates to how early or late the spark plug fires in relation to the axial position of the piston within the cylinder. For instance, when the engine is being operated at high speeds it is desirable to initiate the combustion process early, such that the combustion reaction has adequate time to develop and assert its force upon the piston. Thus, the ignition timing control system delivers a spark to the combustion chamber before the piston reaches a top-dead-center (TDC) position, an occurrence commonly referred to as timing advance. Conversely, if the engine is being operated at relatively low speeds, the control system instructs the spark plug to fire at a point closer to TDC (either slightly before or slightly after). In the case where the spark plug fires slightly after TDC, a timing retard has occurred and allows less time for the combustion process to develop. Manipulation of the ignition timing is helpful for optimum performance, and has been widely utilized according to a multitude of techniques.

Vehicle ignition timing control systems often use microprocessor-based closed loop circuits to receive electronic inputs from throughout the vehicle and adjust the ignition timing accordingly. These inputs can vary widely, but typically include operating parameters such as engine speed, intake manifold pressure, intake air temperature, throttle position, engine exhaust emissions, etc. By adjusting the ignition timing according to readings sensed around the engine, the timing control system is able to adapt to changing conditions and thereby enables the engine to operate more efficiently and with decreased exhaust emissions. While the closed loop feedback utilized in these types of timing systems contributes to the overall performance of the engine, other factors need to also be considered.

For example, the ignition timing needs of the engine when it is initially started up vary considerably from those of the engine once it has been running and is warm. Similarly, ignition timing needs of an engine during an idle period are different from those required by an engine experiencing significant acceleration. Thus, a single closed loop feedback routine for ignition timing may not be ideal across a wide spectrum of operational modes.

The air-to-fuel ratio of the combustible mixture being provided to the combustion chamber also affects the operating characteristics of the engine. The air-to-fuel ratio of the mixture refers to the relative amount of air to fuel in the combined mixture being supplied by the carburetor to the engine. By increasing the percentage of fuel in the combustible mixture, the mixture becomes "richer", while increasing the percentage of air has the effect of making the mixture "leaner". During high load conditions, such as when the engine is initially being started or when the engine experiences a sudden acceleration, a richer mixture is often desired. Likewise, during low load conditions, such as when the engine is experiencing a rapid deceleration, a leaner mixture may be advantageous.

For example, the electronically controlled carburetor disclosed in U.S. Pat. No. 6,273,065 B1 and issued to Tecumseh Products is capable of controlling an air/fuel mixture supplied to the engine. According to this patent, a rotating flywheel carrying a magnet induces a pulse which is fed to an electronic control unit. The electronic control unit utilizes this information to control the discharge of stored energy to either a spark plug or to a solenoid, which is part of the carburetor and controls or adjusts the amount of air introduced into the air/fuel mixture. In this manner, the electronic control unit is capable of enriching or enleaning the air/fuel mixture.

Large automotive vehicle engines often have complex electronic control systems with numerous sensors measuring engine parameters such as intake air temperature, engine temperature, mass air flow, exhaust emissions, and engine speed. Smaller low cost, light duty combustion engines, however, do not have the same luxury. In an effort to minimize cost and stay within significant electric power consumption and spatial constraints, small engines utilized in low cost light duty applications may only be able to adjust the ignition timing and/or the air-to-fuel ratio according to one or two input parameters.

Accordingly, it would be advantageous to provide a small, low cost control system that included both an electronic ignition timing control and an air-to-fuel ratio control for use with a small displacement engine. Furthermore, it would be desirable if that control system was capable of utilizing a limited number of parameters, as well as independent operating sequences, to improve the performance and emissions of the engine.

SUMMARY OF THE INVENTION

The above-noted shortcomings of prior art ignition and air-to-fuel ratio control systems are overcome by the present invention which provides a control system for use with light duty combustible engines in which an ignition timing control and an air-to-fuel ratio control are operated according to an independent operating sequence which the system is capable of selecting according to the speed of the engine. Some of the potential independent operating sequences include a Cranking sequence, a Warm Up sequence, an Acceleration sequence, a Come Down sequence, a Recovery Bump sequence, and a Normal Mode sequence, as well as additional operating sequences dependent upon engine temperature.

Furthermore, the present invention provides methods for controlling the ignition timing and the air-to-fuel ratio of a combustible mixture by utilizing steps that include receiving an electronic signal representative of engine speed, utilizing that signal to select from a plurality of independent operating sequences, determining either an Ignition signal or an Air/Fuel signal based upon the selected operating sequence, and also either providing the Ignition signal to an ignition device or providing the Air/Fuel mixture to a valve control device.

Object, features, and advantages of this invention include providing an ignition timing and air-to-fuel ratio control system which improves the operating performance and emissions for a light duty combustible engine, and is of relatively simple design, economical manufacture and assembly and has a long and useful life in service.

DETAILED DESCRIPTION OF THE PREFERRED EMBODIMENT

Figure 1:
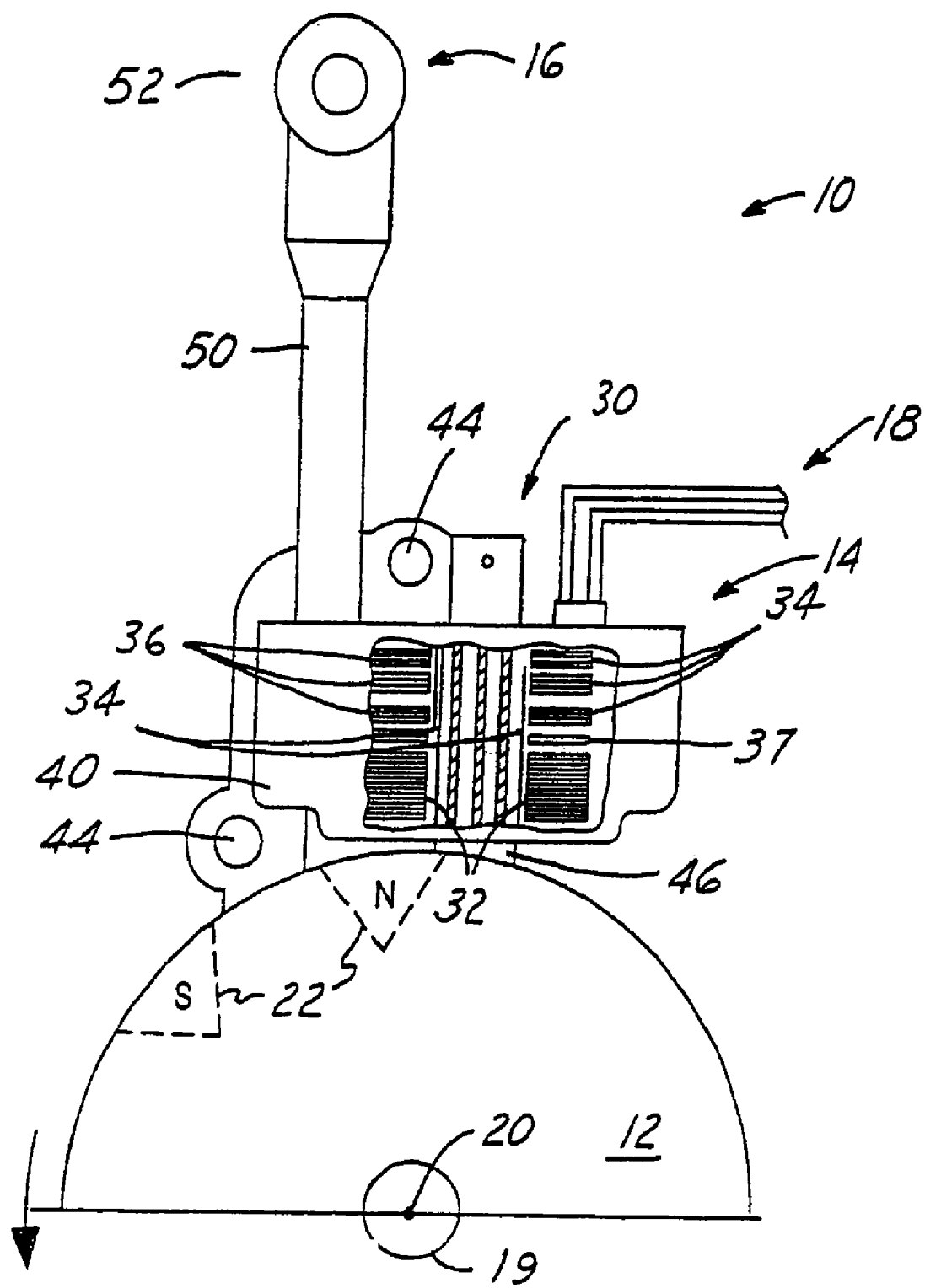
FIG. 1 is a cutaway semi-schematic view of the control system of the present invention.

Referring to FIG. 1, there is shown an exemplary signal generation system 10 for use with a low cost, light duty single cylinder four cycle engine, such as the type typically employed by lawn and garden equipment. Signal generation system 10 could be constructed according to one of numerous designs, such that it interacts with a flywheel 12 and generally includes a control system 14, an ignition boot 16 for connection to a spark plug, and wires 18 for connecting to a valve actuating solenoid. The flywheel is a weighted disk-like component that is coupled to the crankshaft 19 and thus rotates about an axis 20 under the power of the engine. By using its rotational inertia, the flywheel moderates fluctuations in engine speed, thereby providing a more constant and even output. Flywheel 12 includes magnets or magnetic sections 22 located near the outer circumference of the flywheel. Once the flywheel is rotating, these magnetic sections spin past and electromagnetically interact with components of the control system 14 such that a signal indicative of the rotational speed of the flywheel, and hence the engine, is induced. This signal can also be used to keep track of the number of engine revolutions and plays a role in the operation of both the ignition timing control and the air-to-fuel ratio control systems, as will be subsequently explained.

Control system 14 is specifically positioned in close proximity to the outer circumference of flywheel 12, and generally comprises a lamstack 30, a charge winding 32, a primary ignition winding 34, a secondary ignition winding 36, a solenoid winding 37, circuit 38 (FIG. 2), and a housing 40. The circuit 38 may be located remotely from the lamstack 30 and the various windings. As magnetic sections 22 rotate past the lamstack, which is a stack of ferromagnetic or magnetically permeable laminate pieces, a magnetic field is introduced into the lamstack which, in turn, induces a voltage in charge winding 32. The charge winding circumferentially surrounds the lamstack such that the lamstack is generally positioned along the center axis of the charge winding. The voltage induced in charge winding 32 is used to power the circuit, charge an ignition discharge storage capacitor, and provide the control system with an engine speed input signal, as will all be subsequently explained. Like the charge winding, primary ignition winding 34 is also designed to circumferentially surround the lamstack and inductively interacts mostly with a secondary ignition winding 36. As is commonly known in capacitive discharge ignition systems, a spark is delivered to the combustion chamber by discharging a capacitor across the primary winding, thereby inducing a high voltage pulse across the secondary winding 36 that subsequently creates a spark across the spark gap of a spark plug. Solenoid winding 37 also surrounds the lamstack, and provides a capacitor with a charge such that the capacitor may selectively discharge its stored energy and drive a valve actuating solenoid of a carburetor, as will be explained in more detail. Housing 40 can be made of plastic and protects the components of the control system. Mounting holes 44 are used to secure signal generation system 10 in place such that a small air gap 46 exists between the lamstack and the outer circumference of the flywheel. The airgap should be small enough to allow for sufficient electromagnetic coupling, yet large enough to account for tolerance variances in the components.

Ignition boot 16 connects the control system 14 to a spark plug 47 (seen in FIG. 2) and generally includes an elongated copper wire connector 50 and a fastening end 52. Connector 50 conducts the high voltage ignition pulse triggered by the control system along an electrical conductor surrounded by a protective sheathing. The fastening end is designed to receive the terminal end of the spark plug, such that the two components are physically secured to each other as well as being in electrical communication.

Two wires 18 extend from housing 40 and connect the control system 14 with a solenoid 58 (seen in FIGS. 2 and 4) such that an electrical signal for controlling the state of the solenoid is provided. Preferably, the solenoid is a latching solenoid, meaning that if the solenoid is energized and driven into a particular state it will remain in that state until energized again. The electrical signal from the control system controls the state of the solenoid, which in turn affects the air-to-fuel ratio of the combustible mixture being supplied by the carburetor to the engine combustion chamber. Preferably, the solenoid controls a valve which when open bleeds air into the mixing passage of the carburetor, downstream of a throttle valve, to provide a relatively leaner air-to-fuel ratio. Numerous designs exist for controlling the ratio of air-to-fuel, for instance the solenoid could just as easily be coupled to a valve varying the relative amount of fuel supplied, and all are intended to come within the scope of this invention.

In engine operation, the movement of the piston turns the crankshaft, which in turn rotates flywheel 12. As the magnetic sections 22 rotate past the lamstack 30, a magnetic field is created which induces a voltage in the nearby charge winding 32 which is used for several purposes. First, the voltage may be used to provide power to the control system 14, including components of circuit 38 (seen in FIG. 2). Second, the induced voltage is used to charge a capacitor that stores the energy until it is instructed to discharge, at which time the capacitor discharges its stored energy across primary ignition winding 34, as is commonly known in the art. Lastly, the voltage induced in the charge winding is used to produce an engine speed input signal, which is supplied to a microcontroller of the circuit 38. This engine speed input signal plays a role in the operation of the ignition timing and air-to-fuel ratio control systems of the present invention, as it is typically the only operating parameter being monitored. Concurrent with inducing a voltage in winding 32, the magnetic field created in the lamstack also induces a voltage in solenoid winding 37. This induced voltage is provided to several capacitors, which store the energy and are selectively connected to latching solenoid 58 (seen in FIGS. 2 and 4). Thus, the air-to-fuel ratio may be adjusted by selectively discharging the capacitors and thereby driving the solenoid into a particular state. As previously stated, the microcontroller receives the engine speed signal from the charge winding and executes a series of instructions based upon that signal and the particular operating sequence that the engine is currently in. That series of instructions determines a desired timing advance or retard, as well as a desired air-to-fuel ratio for the particular operating circumstance. Subsequently, the microcontroller transmits an Ignition signal which causes a high voltage ignition pulse to be sent to the spark plug, and transmits an Air/Fuel signal to the latching solenoid.

Description of Electrical Circuit

Figure 2:
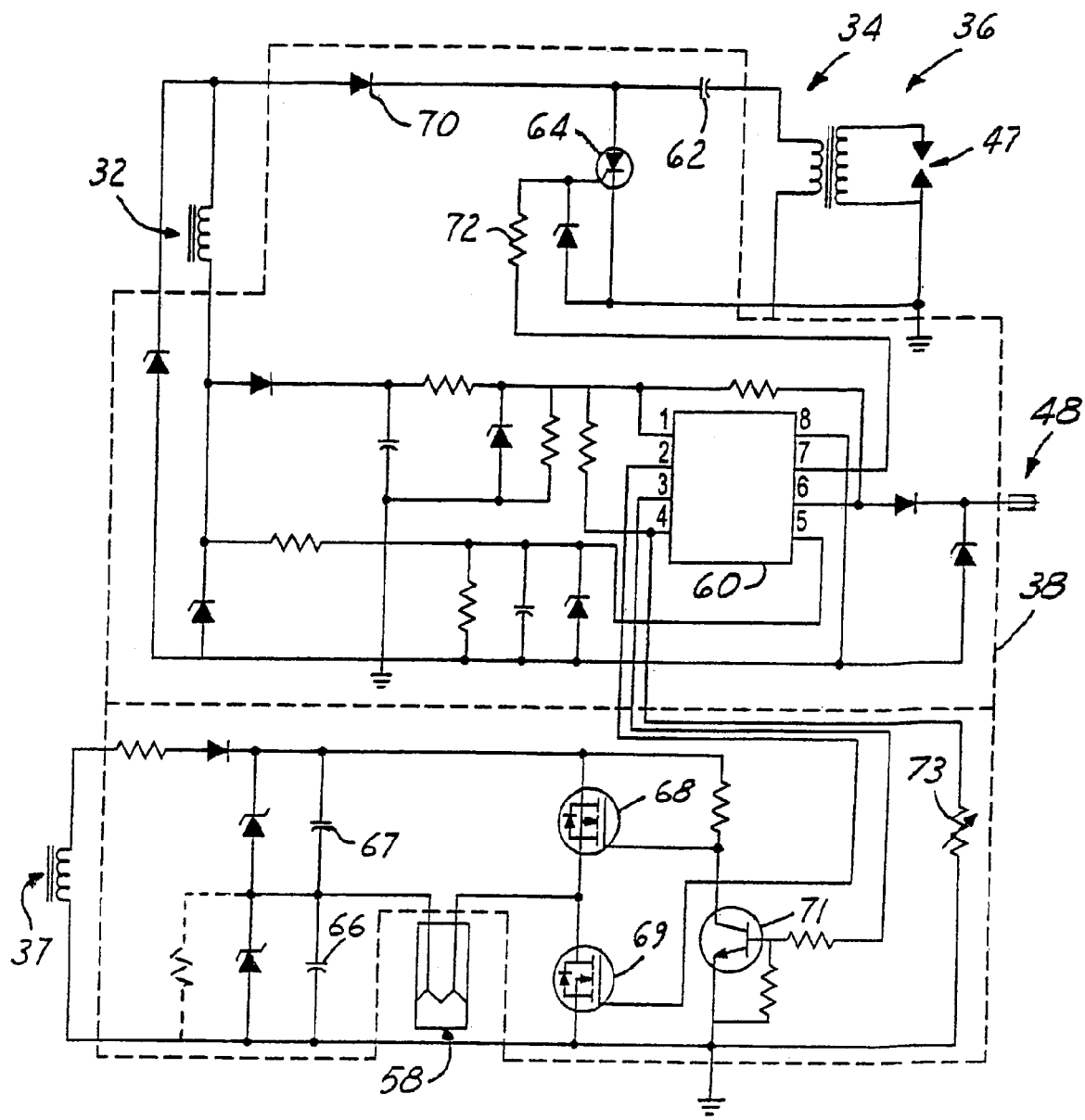
FIG. 2 is a schematic diagram of a circuit of the control system of the present invention.

Referring now to FIG. 2, the control system 14 includes circuit 38 as an example of the type of circuit that may be used to implement the ignition timing and air-to-fuel ratio control systems of the present invention. However, many variations of this circuit may alternatively be used without departing from the scope of the invention. Circuit 38 interacts with charge winding 32, primary ignition winding 34, solenoid winding 37, kill switch 48, and latching solenoid 58, and generally comprises a microcontroller 60, an ignition discharge capacitor 62, an ignition thyristor 64, solenoid discharge capacitors 66 and 67, and solenoid transistors 68, 69 and 71.

The microcontroller as shown in FIG. 2 is preferably an 8-pin, 4 MHz processor, such as model #12C508 produced by Microchip, Inc., that utilizes 1024 Kb of memory to store the code for the ignition timing and air-to-fuel ratio control systems of the present invention, as well as memory for variables. Various other microcontrollers or microprocessors may be used, however. Pin 1 of the microcontroller is coupled to charge winding 32 via a resistor and diode, such that an induced voltage in the charge winding is rectified and supplies the microcontroller with power. Also, when a voltage is induced in the charge winding 32, as previously described, current passes through a diode 70 and charges ignition discharge capacitor 62, assuming ignition thyristor 64 is in a non-conductive state. The ignition discharge capacitor holds the charge until the microcontroller changes the state of the thyristor 64. Pin 2 of the microcontroller is coupled to the gate of solenoid transistor 69 and controls the discharge of energy stored in first solenoid capacitor 66. Discharge of this capacitor drives the latching solenoid 58 in a first direction to a first solenoid state. Pin 3, on the other hand, is coupled to the base of transistor 71 such that it controls the state of that transistor. For reasons that will be explained, solenoid transistor 68 cannot be controlled directly by the microcontroller, thus, the microcontroller controls the state of transistor 71, which controls the state of solenoid transistor 68, which in turn controls the discharge of a second solenoid capacitor 67. Discharge of capacitor 67 drives the latching solenoid in a second direction to a second solenoid state. Pin 4 is coupled to a thermistor 73 such that the microcontroller is provided with an optional input signal representative of the engine temperature, as will be explained. Microcontroller pin 5 is also coupled to the charge winding and receives an electronic signal representative of the engine speed. The present invention uses that engine speed signal to select a particular operating sequence, the selection of which affects the desired spark timing and air-to-fuel ratio of the combustible mixture, as will be subsequently explained in greater detail. Pin 6 is coupled to the kill switch 48, which acts as a manual override for shutting down the engine. Pin 7 is coupled to the gate of thyristor 64 via resistor 72 and transmits from the microcontroller an Ignition signal which controls the state of the thyristor. When the Ignition signal on pin 7 is low, the thyristor is nonconductive and capacitor 62 is allowed to charge. When the Ignition signal is high, the thyristor is conductive and capacitor 62 discharges through primary winding 34, thus causing an ignition pulse to be induced in secondary winding 36 and sent to spark plug 47. Thus, the microcontroller governs the discharge of capacitor 64 by controlling the conductive state of the thyristor. Lastly, pin 8 provides the microcontroller with a ground reference.

In operation, charge winding 32 experiences an induced voltage that charges ignition discharge capacitor 62, and provides the microcontroller with power and an engine speed signal. At the same time, the solenoid winding 37 also experiences an induced voltage, which is used to charge first and second solenoid capacitors 66, 67. In the preferred embodiment, these capacitors have an equal capacitance such that approximately 25V is stored on each capacitor. As the capacitors are being charged, the microcontroller executes a series of instructions that utilize the engine speed signal to determine if and how much of a spark advance or retard is needed, as well as any desired adjustment of the air-to-fuel ratio. The microcontroller then outputs an Ignition signal on pin 7, according to the calculated ignition timing, which turns on thyristor 64. Once the thyristor is conductive, a current path through the thyristor and primary winding is formed for the charge stored on capacitor 62. The current through primary winding 34 induces a high voltage ignition pulse in secondary winding 36. This high voltage pulse is then delivered to spark plug 47 where it arcs across the spark gap, thus beginning the combustion process. If at any time kill switch 48 is activated, the microcontroller halts and thereby prevents the ignition system from delivering a spark to the combustion chamber.

Concurrently, the microcontroller executes a series of instructions utilizing the engine speed to determine a desired adjustment of the air-to-fuel ratio of the combustible mixture being supplied to the engine. In order to control the ratio of the air-to-fuel, meaning to enrich or enlean the mixture, circuit 38 is coupled to the latching solenoid 58, which preferably controls the amount of air introduced into the combustible mixture as will be subsequently discussed in greater detail. When energized, the latching solenoid is driven into a particular solenoid state (either open or closed) and remains in that state until energized again. Initially, both solenoid transistors 68 and 69 will be "off" and transistor 71 will be "on", which causes solenoid winding 37 to charge capacitors 66 and 67. In order to drive the latch solenoid in a first direction (which can either open or close the solenoid), pin 3 of the microcontroller sends a "low" signal to the base of transistor 71, thus turning that transistor off. This causes the gate voltage of transistor 68 to rise, thereby turning that transistor on and providing the charge stored on capacitor 67 with a conductive path. Current flows from capacitor 67, through transistor 68, through latching solenoid 58, and back to the capacitor such that the solenoid is driven in a first direction. It is worth noting, in order to drive the solenoid in this manner the microcontroller cannot be directly coupled to transistor 68. Because the source voltage of that transistor is already at such a high voltage, approximately one-half of the total voltage stored between capacitors 66 and 67, and because the gate voltage must be higher than the source voltage to turn the transistor on, the microcontroller would be required to put out a signal on pin 3 in excess of 25 v in this particular embodiment. Thus, the need to indirectly couple pin 3 to transistor 68. In order to drive the latch solenoid in a second direction, pin 3 of the microcontroller first turns on transistor 71, thus turning off transistor 68. Subsequently, pin 2 turns on transistor 69, which unlike transistor 68, may be directly controlled by the microcontroller. Turning on transistor 69 creates a current path for the energy stored on capacitor 66 that flows through the solenoid in a second direction, opposite that of the current path provided for capacitor 67. This current path flows from capacitor 66, through latching solenoid 58, through transistor 69, and back to capacitor 66. Accordingly, signaling by pin 3 drives the latching solenoid in a first direction and signaling by pin 2 drives the solenoid in a second direction, opposite the first direction. In this manner, the microcontroller is capable of controlling the operational state of the latching solenoid, and thus the relative air-to-fuel ratio of the combustible mixture being provided by the carburetor.

Description of Carburetor with Air Bleed Unit

Figure 3:
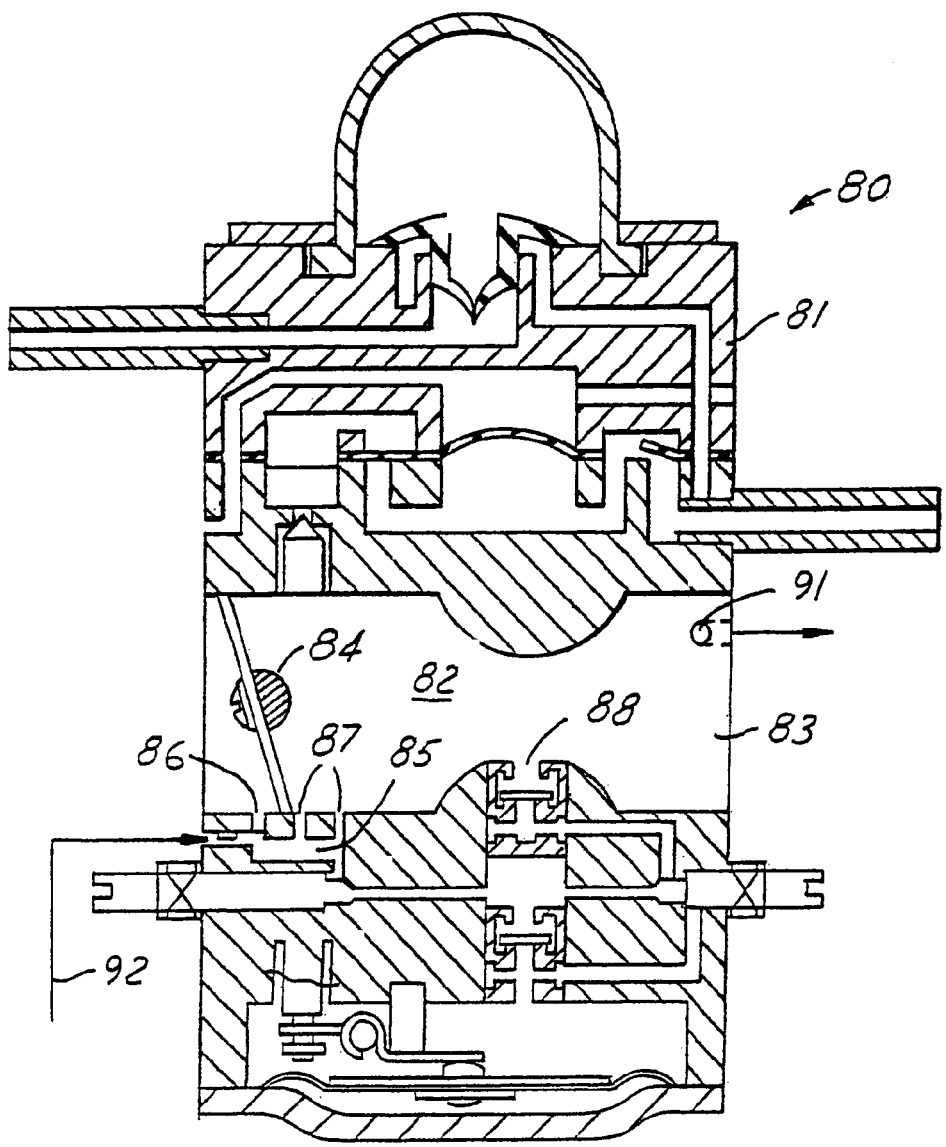
FIG. 3 is a sectional view of a carburetor for a low cost, light duty engine.
Figure 4:
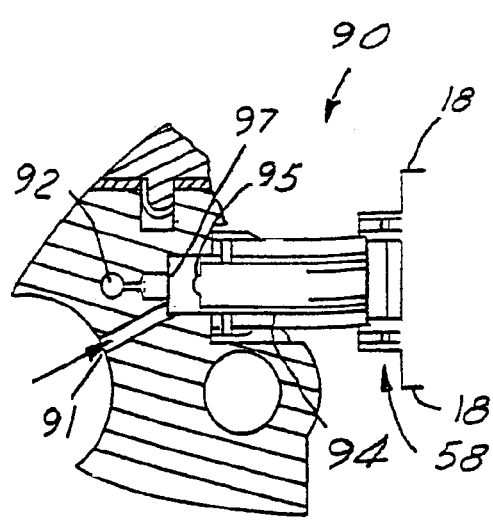
FIG. 4 is a fragmentary sectional view of an air bleed unit for the carburetor of FIG. 3.

The control system of the present invention, particularly the air-to-fuel ratio control system, could be used with one of numerous types of carburetor air bleed systems, including the exemplary embodiment shown in FIGS. 3 and 4. It should be noted, the present invention is not limited to that embodiment only. The carburetor air bleed system shown is similar to that disclosed in U.S. patent application Ser. No. 09/909,540 filed Jul. 20, 2001, which is incorporated herein by reference. FIG. 3 illustrates a diaphragm carburetor 80 having a carburetor body 81, a fuel-and-air mixing passage 82, an inlet 83, a throttle valve 84, an emulsifying chamber 85, an idle fuel nozzle 86, acceleration ports 87, and a main fuel nozzle 88, as is all well known in the art. Air at near atmospheric pressure flows from inlet 83 through mixing passage 82, where it mixes with fuel from either idle fuel nozzle 86 located downstream from the throttle valve, or main fuel nozzle 88 located upstream from the throttle valve. The throttle valve rotates to control the total amount of the air/fuel mixture flowing to the engine. Again, this type of diaphragm carburetor is known in the art, therefore, a complete description of all aspects of its structure and operation has been omitted. For additional description of diaphragm carburetor 80, please refer to the above-referenced application.

To enhance fuel mixing during idling conditions, acceleration ports 87 are located such that they communicate between the mixing passage 82, upstream of the closed throttle valve, and the emulsifying chamber 85. During idle, the throttle valve is rotated to a position similar to that seen in FIG. 3 such that the valve prevents the air/fuel mixture from freely flowing through mixing passage 82 to the engine. By preventing the mixture from freely flowing through the mixing passage, a powerful vacuum forms on the downstream side (left side) of the throttle valve. Ports 87, however, allow a portion of the air flow to bypass the throttle valve, wherein the bypassed air flow picks up fuel located in the emulsifying chamber 85. As the bypassing air flow picks up fuel from the emulsifying chamber, it provides a rich combustible mixture which is then discharged into the low pressure vacuum portion of passage 82 through the fuel idle nozzle 86. The ports are preferably aligned along a portion of a wall of the mixing passage and within the sweeping action of a throttle valve plate. As the throttle valve 84 opens, its plate sweeps past ports 87, one-by-one, reducing the air pressure differential or vacuum downstream of the throttle valve. This reduction in the air pressure differential across the throttle valve causes a reduction in air flow through the emulsifying chamber 85 and enleans the combustible mixture being supplied.

Turning now to FIG. 4, there is shown an air bleed unit 90 which is used by the control system of the present invention to control and adjust the relative air-to-fuel ratio of the combustible mixture being provided to the engine. The overall air-to-fuel ratio is a function of the relative amounts of air and fuel being supplied within carburetor 80. Thus, one can enrich the combustible mixture by increasing the relative amount of fuel, by decreasing the relative amount of air, or both. Conversely, one can enlean the combustible mixture by increasing the relative amount of air, by decreasing the relative amount of fuel, or by both. While primarily controlling the air-to-fuel ratio by increasing or decreasing the relative amount of air, in practice, air bleed unit 90 actually affects both the relative amounts of air and fuel being introduced. The air bleed unit is located between an air bleed inlet 91 and an air bleed line 92, and generally includes a solenoid 58, a solenoid plunger 94, and wires 18. When the air bleed unit 90 is in an open state, the tip or valve head 95 of plunger 94 is retracted from valve seat 97 such that air bleed line 92 communicates with air bleed inlet 91. The air bleed inlet provides a clean air source that is upstream of both fuel nozzles and is substantially at atmospheric pressure. Opening the air bleed unit, and hence drawing clean atmospheric air from the mixing passage and delivering it to the idle fuel nozzle, has the effect of enleaning the mixture. Primarily, opening the air bleed valve increases the relative amount of air in the combustible mixture, thus having the effect of increasing the air-to-fuel ratio. Secondarily, the injection of atmospheric air through idle fuel nozzle 86 also decreases the vacuum on the downstream side of throttle valve 84. This reduction in vacuum decreases the pressure differential across the throttle valve and thus the relative amount of fuel being added to the mixture via the emulsifying chamber. Accordingly, operation of the air bleed unit 90 can adjust and control the air-to-fuel ratio of the combustible mixture being provided by the carburetor to the engine.

The air bleed unit 90 is coupled to microcontroller 60 such that the control system of the present invention controls the state of latching solenoid 58, and hence the air-to-fuel ratio of the combustible mixture. Referring briefly to FIG. 2, one of the wires 18 is coupled to a circuit node located between capacitors 66 and 67, and the other wire is coupled to a circuit node located between the source of transistor 68 and the drain of transistor 69. If either of these wires is supplied with energy stored in capacitors 66 or 67, as previously discussed, they energize latching solenoid 58 which drives solenoid plunger 94 into a certain state where the plunger and solenoid remain until energized again. For example, if the solenoid and plunger are initially in the open state seen in FIG. 4, which corresponds to an open air bleed unit, and the solenoid is energized, the solenoid drives the plunger to the left in FIG. 4 such that valve head 95 rests on seat 97. The seating of the valve head closes the valve and obstructs airflow between the air bleed inlet 91 and the air bleed line 92. Once driven to this position, which corresponds to a closed air bleed unit, the solenoid and plunger will remain in this position until energized again, thus the "latching" nature of the solenoid. It is worth noting, solenoid 58 could be mounted on carburetor body 81, as seen in FIG. 4, or it could be located remotely from the carburetor. Also, it is envisioned that a solenoid could be used to control the amount of fuel introduced into the mixture, as opposed to controlling air-to-fuel ratio by primarily controlling the introduction of air, as described above.

Description of Software for Control System

The control system of the present invention utilizes various instructions to calculate the ignition timing and air-to-fuel ratio of a combustible mixture according to the speed and particular operating sequence of the engine. An Overall Timing value, which dictates the final ignition timing, is determined by adding together an Advance value, which represents normal operation ignition timing and is generally unaffected by the specific engine operational sequences, and a BaseTime value, which is an additional timing value determined according to those sequences. Therefore, the Overall Timing Value is the sum of the Advance and BaseTime values and may vary from 45° before TDC to 15° after TDC, depending on what is required for optimal performance under those specific conditions. Also, an Air/Fuel signal, which either opens or closes air bleed unit 90 by changing the state of latching solenoid 58, may be generated during execution of the same sequence of instructions as those which calculate the Overall Timing value.

Figure 5:
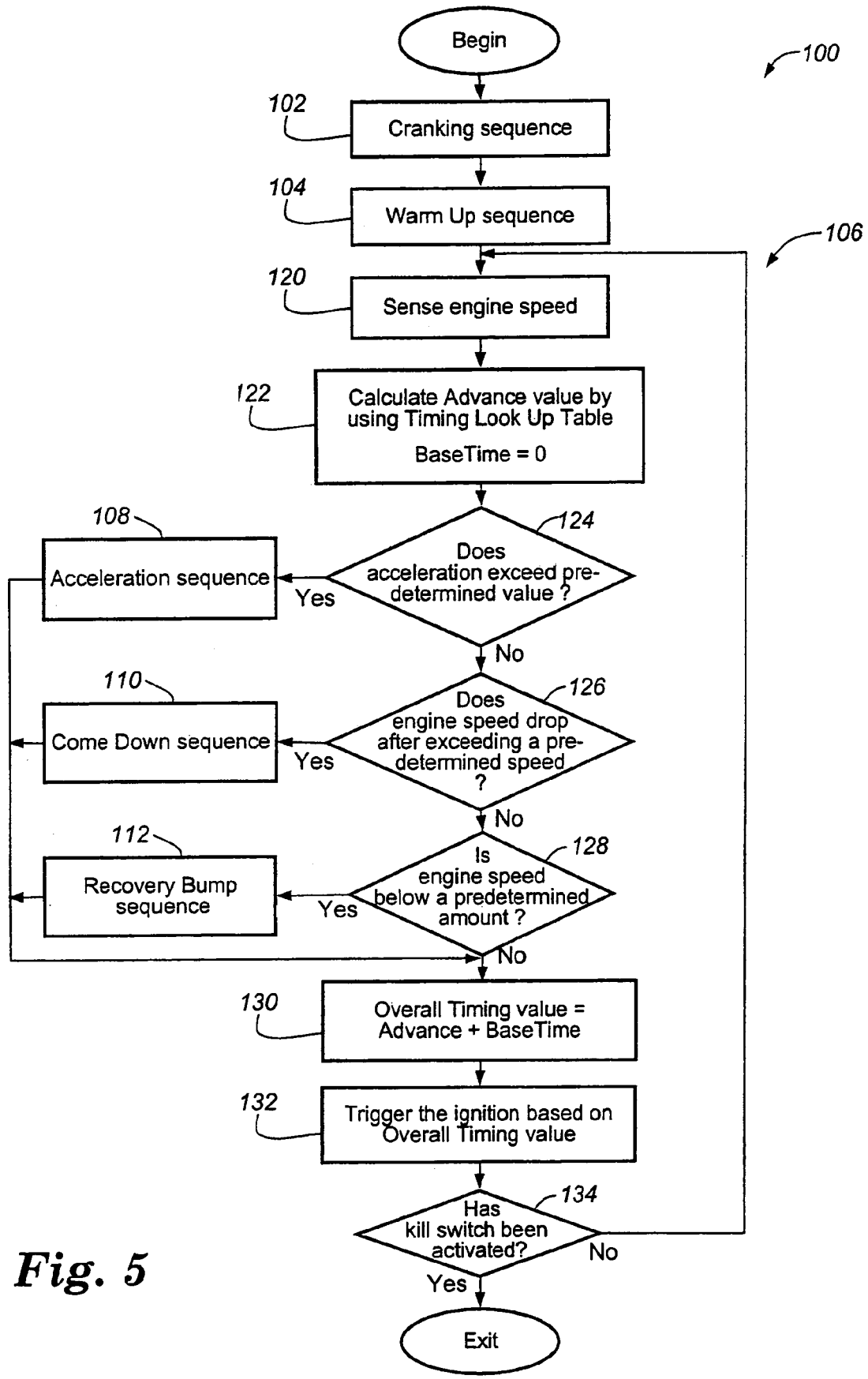
FIG. 5 is a flowchart showing the operational steps of a Normal Mode sequence of the control system of the present invention.

Referring to FIG. 5, the overall operation 100 of the control system of the present invention is shown from when the engine is initially started until the operator engages the kill switch to shut the engine off. The operational sequences seen are groups of instructions, similar to sub-routines, that are designed to optimally control the ignition timing and air-to-fuel ratio in light of current conditions, and generally include a Cranking sequence 102, a Warm Up sequence 104, a Normal Mode sequence 106, an Acceleration sequence 108, a Come Down sequence 110, and a Recovery Bump sequence 112.

After being initially turned on, the engine ignition timing and air-to-fuel ratio are controlled by the Cranking sequence, which is designed to get the engine started and is only in control of the ignition timing for a small number of engine revolutions. Following the Cranking sequence is the Warm Up sequence, which is designed to bring the engine to a normal operating environment. Unlike the Cranking sequence, which only controls the ignition timing and air-to-fuel ratio for a small, predetermined number of engine revolutions, the Warm Up sequence controls the ignition timing and air-to-fuel ratio until either the speed of the engine surpasses a predetermined value or the ignition timing BaseTime value has been reduced to zero. According to an alternative embodiment, Warm Up sequence 104 may additionally requires the temperature of the engine, as measured by thermistor 73, to reach a predetermined value before the Warm Up sequence is exited, during which time the control system causes latching solenoid 58 to pulse between open and closed states, thus simulating a 'half-choke' type situation. Once the engine has cycled through the Cranking and Warm Up sequences, the Normal Mode sequence is initiated. The Normal Mode sequence is the operational mode that the control system is in when no unique circumstances, such as unusually low engine speeds, cause the control system to enter one of the other specific operational sequences. For the ignition timing, the Normal Mode sequence simply uses an engine speed versus timing look up table to determine the Advance value and sets the BaseTime value to zero. As for the air-to-fuel ratio control, the Normal Mode sequence simply leaves the air bleed unit 90 in an open position, thereby enleaning the combustible mixture. If the Normal Mode ever detects an increase in engine speed exceeding a predetermined rate, the Acceleration sequence is initiated. The Acceleration sequence advances the ignition timing and temporarily enriches the air-to-fuel ratio to coincide with the increased engine speed, and after completion will return operating control to the Normal Mode. From the Normal Mode, if a sufficient engine speed is sensed followed by a decrease in speed, the Come Down sequence may be called upon. The Come Down sequence temporarily manipulates the ignition timing and air-to-fuel ratio to improve the engine's ability to quickly return from higher to lower RPMs. After completion of the Come Down sequence, the Normal Mode will control operation but will transfer control to the Recovery Bump sequence if the engine speed dips below a predetermined level. The Recovery Bump is used to improve the engine's ability to recover from a low RPM condition which may otherwise result in engine stall, and will return control to the Normal Mode upon completion.

The Normal Mode sequence, as seen in FIG. 5, essentially begins following the Warm Up sequence. Step 120 samples and stores the current speed of the engine, as is done for each engine revolution. As previously mentioned a count of engine revolutions can be determined from the engine speed signal, and vice-versa. Thus, by sampling either an engine speed signal or an engine revolution counter, both parameters would be known. Step 122 utilizes the engine speed reading by referring to a look up table that relates engine speed to ignition timing. Different engines may use different tables, as each table is designed for a particular engine and application. The timing value referenced for a particular engine speed is the Advance value discussed in the previous section. Step 122 also sets the BaseTime value to zero, thus making the Overall Timing value (Advance+BaseTime) simply equal to the Advance value. Succeeding step 122 is decision step 124, which determines whether or not operation of the system will enter Acceleration sequence 108. If the rate of change between the latest engine speed reading and either the previous reading or several previous readings exceeds a predefined amount, 300 RPMs within 1 revolution in the preferred embodiment, then the control system will enter the Acceleration sequence 108, as will be further explained. If the rate of change in engine speed does not exceed this threshold amount, then operation will pass to step 126.

Like step 124, step 126 is checking for unusual engine operating conditions, conditions that warrant the control system entering specific sequences designed to combat those unusual circumstances. Decision step 126 checks to see if the engine speed is dropping after exceeding a predetermined RPM, such as 6500 RPM. If so, Come Down sequence 110 is initiated such that the speed of the engine is quickly brought back to normal operating levels, as will also be explained in further detail. If the engine speed does not satisfy the prerequisites for initiating the Come Down sequence, then control remains in the Normal Mode sequence and is passed to decision step 128.

Step 128 determines whether or not Recovery Bump sequence 112 needs to be called upon to avoid a potential engine stall. If the engine is running at a low RPM then the Recovery Bump sequence is used to increase the engine speed, if not the Normal Mode proceeds to step 130. Step 130 determines the Overall Timing value by adding the Advance value, which was found using the look up table in step 122, to the BaseTime value. Because the BaseTime value was set to zero in step 122, that value will remain zero unless otherwise changed. In this scenario, the Overall Timing value will simply be the Advance value already determined. Step 132 sends an Ignition signal to direct the discharge of capacitor 62 according to the Overall Timing value found in step 130. Following this triggering, decision step 134 checks to see if the operator has engaged the kill switch. If the kill switch is engaged, the system closes the air bleed unit 90, such that it is in the proper position the next time the system is turned on, immediately shuts the engine down, and the control system exits the sequence. If the kill switch has not been engaged, then control passes to the engine speed sensing step 120, and the Normal Mode sequence repeats itself. Thus, the Cranking and Warm Up sequences are only engaged following the starting of the engine, afterwards the control system of the present invention operates in a Normal Mode until certain circumstances cause the operation to transfer to specific sequences designed to operate the engine optimally in light of those circumstances.

Figure 6:
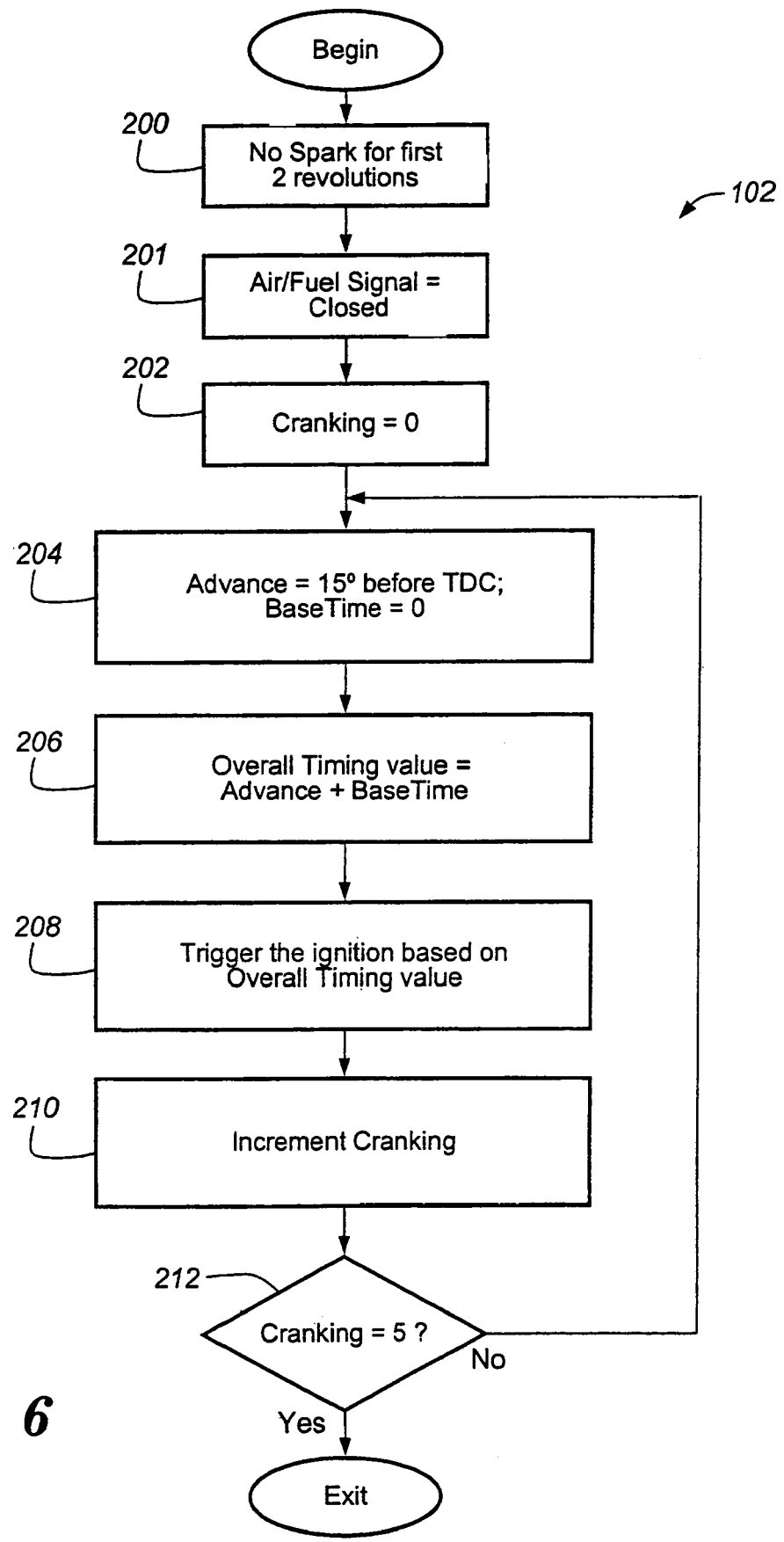
FIG. 6 is a flowchart showing the operational steps of a Cranking sequence of the control system of the present invention.

Referring now to FIG. 6, there is shown the Cranking sequence 102, which is initiated immediately following the starting of the engine and provides an independently tailored operating sequence for the starting event. By utilizing this specifically designed sequence, the control system of the present invention can control the ignition timing and air-to-fuel ratio in an optimal fashion without being limited by the requirements associated with normal idling. As seen in step 200, the ignition timing control system does not produce a spark for the first two engine revolutions. This "no spark" event is executed in order to allow the discharge capacitor to store more energy, thus producing a "hotter" spark, and to allow a "wetting" of the intake track. Both of these consequences improve the combustion characteristics once the combustion process is initiated. Step 201 closes latching solenoid 58, if not already closed, such that no air bleed occurs through air bleed line 92, thus enriching the combustible mixture as previously discussed. In order to close the air bleed unit, microcontroller 60 sends a Closed Air/Fuel signal on either pin 2 or 3, depending upon how the latching solenoid is wired, which causes one of the capacitors 66, 67 to discharge its stored energy through the solenoid. For instance, assuming discharge of capacitor 67 closes latching solenoid 58, step 201 causes pin 3 to output a Closed Air/Fuel Signal. This signal turns transistor 71 off, thereby causing capacitor 67 to discharge and drive the latching solenoid into a closed state such that valve head 95 rests on valve seat 97. The solenoid, and hence the air bleed unit, remain in a closed state throughout the Cranking sequence and will continue to remain closed until an Open Air/Fuel Bleed Signal is sent on pin 2. Step 202, which relates to the ignition timing, resets a Cranking variable to zero and is only encountered once per Cranking sequence operation. Step 204 sets the Advance timing variable to a predetermined value, 15° before TDC in the preferred embodiment, and the BaseTime value to 0°. In a similar fashion to step 130 of the Normal Mode sequence, step 206 sums the Advance and BaseTime values together, thereby calculating an Overall Timing value. Thus, the ignition timing during the Cranking sequence is a constant value that is determined irrespective of the current engine speed. Step 208 sends an Ignition signal to trigger a high voltage ignition pulse across a spark gap according to the Overall Timing value. After the Cranking sequence has directed an ignition discharge, the Cranking variable is incremented, step 210, and checked in decisions step 212. If the Cranking value has not reached a predetermined number of revolutions, such as 5, then the process is repeated. If Cranking has in fact reached 5, then the Cranking sequence is exited and control of the system is passed to Warm Up sequence 104.

In operation, the Cranking sequence of the preferred embodiment will only control the control system for the first 7 engine revolutions following engine startup, after which, control passes to the Warm Up sequence. The first 2 revolutions are "no spark" revolutions while the next 5 revolutions set the Overall Timing value to 15° before TDC and increment an engine revolution counter, all the while with air bleed unit 90 being closed for enrichment of the combustible mixture. Once the counter equals 5, the Cranking sequence is exited and the Warm Up sequence begins.

Figure 7A:
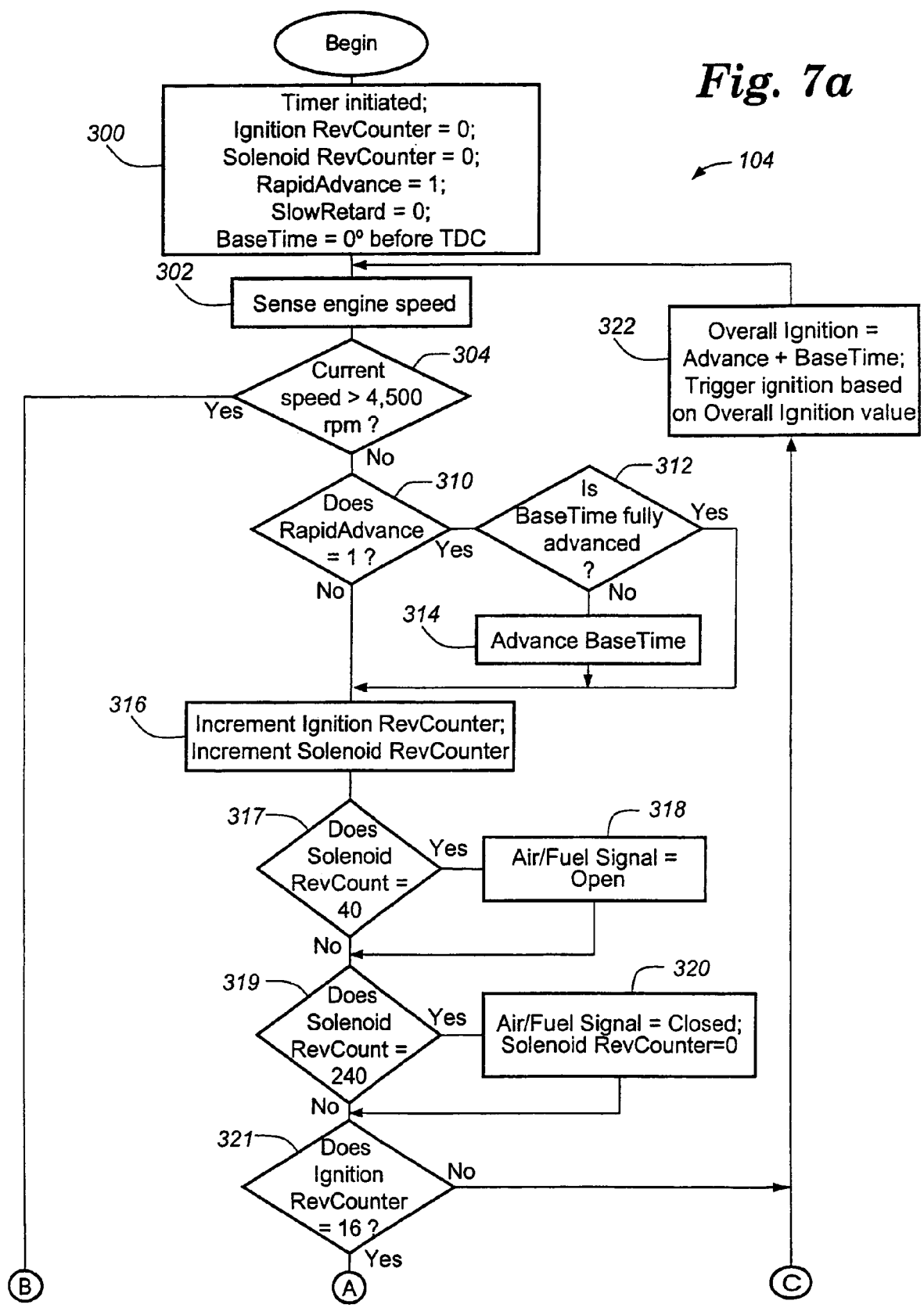
FIGS. 7a–b are flowcharts showing the operational steps of a Warm Up sequence of the control system of the present invention.
Figure 7B:
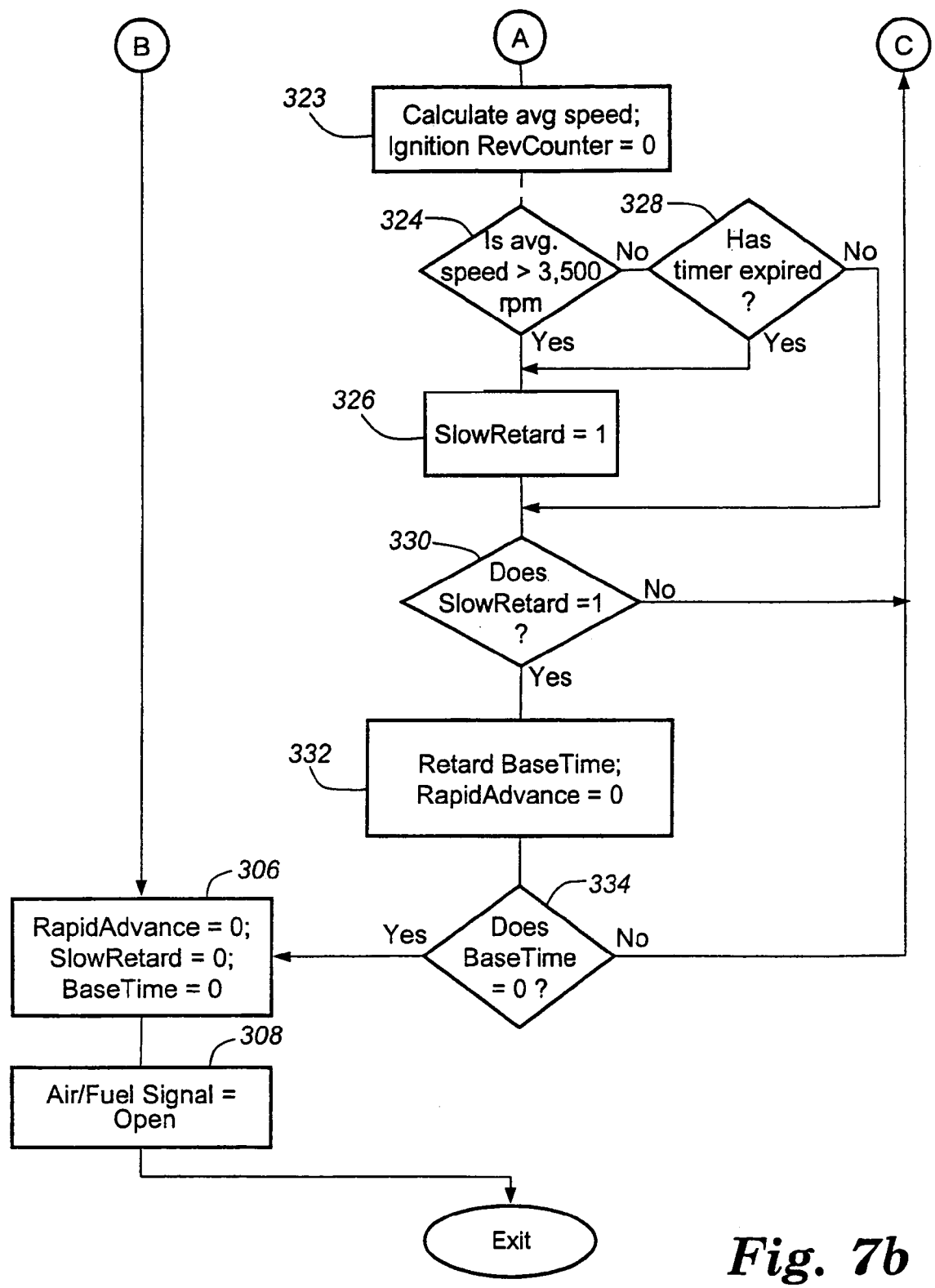

Referring now to FIGS. 7a–7b, the control system 14 of the present invention is described according to Warm Up sequence 104, which is initiated immediately following the Cranking sequence. This sequence is designed to quickly bring the engine to normal operating conditions by advancing the ignition timing as needed, a technique that reduces the chance of engine stall by encouraging the engine to operate at a higher speed, and periodically enriching the air-to-fuel ratio. After entering the Warm Up sequence, step 300 initializes several variables and resets an internal timer. The variables Ignition RevCounter and Solenoid Rev-Counter each count the number of engine revolutions and are set to zero, the RapidAdvance flag is set to 1, the Slow Retard flag is set to zero, and the BaseTime value is set to 0° before TDC. Step 302 senses and stores a value representative of the current engine speed, which decision step 304 compares to a predetermined amount, such as 4,500 RPM, to determine if it is necessary to continue with the Warm Up sequence. If the current speed exceeds 4,500 RPM the engine is already operating at a high enough speed and further timing advance is unnecessary. Thus, the Warm Up sequence is exited by proceeding to step 306, seen in FIG. 7b, which sets the RapidAdvance and SlowRetard flags to zero, as well as setting the BaseTime value to 0°. Following step 306 and just before the Warm Up sequence is exited, step 308 opens latching solenoid 58 and hence air bleed unit 90 such that the air-to-fuel ratio is enleaned. In order to open the air bleed unit, microcontroller 60 sends an Open Air/Fuel signal on either pin 2 or 3, depending upon how the latching solenoid is wired, which causes the solenoid to be driven into an open state. Because the specific operation of the microcontroller in conjunction with the latching solenoid has already been discussed, further discussion has been omitted. Accordingly, air bleed unit 90 is open as operation of the control system enters the Normal Mode sequence.

Referring back to step 304, assuming the current engine speed is less than 4,500 RPM, then the Warm Up sequence proceeds to step 310, which checks the state of the RapidAdvance flag. If the RapidAdvance flag is 1, which it is on the initial time through the sequence due to step 300, then step 312 determines whether or not the BaseTime value has been fully advanced. In the preferred embodiment, fully advanced corresponds to a Base Time value of 30° before TDC, which is added to the Advance value to determine the overall ignition timing for that revolution. However, on the first time through the sequence the BaseTime value is 0° before TDC, and therefore is not representative of the fully advanced condition. Thus, the sequence proceeds to step 314 which advances the BaseTime value by ⅓° per engine revolution. Accordingly, 90 engine revolutions would result in a total BaseTime advancement of 30°. If the BaseTime value is already fully advanced, then there is no need for further advancement and the sequence proceeds to the revolution incrementer seen in step 316. This step increments the variables Ignition RevCounter and Solenoid RevCounter such that each of those variables keeps a running total of the number of engine revolutions that have occurred since they were set to zero. Following the incrementing of the two RevCounters, decision step 317 checks to see if Solenoid RevCounter has reached 40. If the value of Solenoid RevCounter equals 40 then step 318 opens the air bleed unit 90, if the count is either less than or greater than 40 control passes to step 319. Similarly, step 319 checks to see if Solenoid RevCounter is equal to 240. If that counter has reached 240, then step 320 closes the air bleed unit, resets Solenoid RevCounter to 0, and sends control of the program to step 321. Accordingly, monitoring and resetting the variable Solenoid RevCounter in this manner allows the solenoid, and hence the air bleed unit, to be pulsed between "on" and "off" states. The air bleed unit is closed for the first 40 engine revolutions, thus providing the engine with a richer air-to-fuel ratio, and is then opened for the next 200 engine revolutions, after which the cycle starts over with the resetting of the Solenoid RevCounter variable. The preferred embodiment has disclosed a closed/open scenario that corresponds to a 1:5 ratio, however, the predetermined number of engine revolutions (40 and 240, respectively) could easily be changed to account for variances in different types of engines or other basis for altering that ratio. Proceeding now to step 321, the sequence checks the current value of Ignition RevCounter to see if that variable has reached 16 revolutions. This number was chosen for the particular embodiment described, but could also just as easily be a different predetermined amount. If Ignition RevCounter has not reached 16, as is the case during the first time through the sequence, then step 322 determines the Overall Timing value by adding the Advance value, which is found through an engine speed vs. ignition timing look up table that will be subsequently described in further detail, to the BaseTime value. The ignition timing control system then sends an Ignition signal which triggers an ignition pulse according to the Overall Timing value just calculated. Following this, control of the sequence returns to step 302 such that a new engine speed value may be taken. Assuming the current speed of the engine never exceeds 4,500 RPM, this series of steps continues until Ignition RevCounter equals 16.

Once Ignition RevCounter does equal 16, control passes to step 323 seen in FIG. 7b. Step 323 determines the average engine speed over the previous 16 engine revolutions and resets Ignition RevCounter to zero. Decision step 324 considers whether the average speed just calculated exceeds 3,500 RPM. If so, the engine is already operating at a sufficiently high speed, thus, the SlowRetard flag is set to 1, step 326, such that the WarmUp sequence begins to gradually retard the Overall Timing by retarding the BaseTime value. If the average speed does not exceed 3,500 RPM, decision step 328 additionally asks if the timer has expired. Because the WarmUp sequence is intended to control the ignition timing just until the engine is warm, if the timer expires but the average engine speed remains less than 3,500 RPM, the WarmUp sequence will also begin to gradually retard the timing by slowly decreasing the BaseTime value. Decision step 330 determines whether or not the SlowRetard flag has been set. If the flag has not been set (SlowRetard=0), then step 322 calculates the overall timing according to the method previously described, and control again flows to step 302. If the flag has been set, then step 332 retards BaseTime by ⅓° and the RapidAdvance flag is set to zero. Decision step 334 determines if the BaseTime has been reduced to a value of zero. If not, the sequence proceeds to step 322 and the ignition timing is calculated. If the BaseTime is equal to zero, then step 306 sets the RapidAdvance and SlowRetard flags to zero, step 308 opens the air bleed unit 90, in case it was not already open, and the Warm Up sequence is exited.

In operation, Warm Up sequence 104 adjusts the BaseTime value, thus adjusting the Overall Timing value, until either the current engine speed exceeds a predetermined amount or the BaseTime value has been reduced to zero, at which time the sequence is exited and the Normal Mode sequence begins. Furthermore, the Warm Up sequence causes latching solenoid 58, and hence air bleed unit 90, to switch between "on" and "off" states, such that an enriched combustible mixture is intermittently provided by the carburetor to the engine during the Warm Up sequence. As previously addressed, the current speed of the engine is sampled and stored each revolution at step 302. As long as the RapidAdvance flag is set to 1 and the BaseTime value is not fully advanced, BaseTime will be incremented ⅓° per revolution of the engine. If the BaseTime value becomes fully advanced but the RapidAdvance flag is still set to 1, the WarmUp sequence will cycle through steps 302, 304, 310, 312, 316, (317–320 depending on the value of Solenoid Revcounter) 321, and 322 until the Ignition RevCounter is equal to 16. Concurrent with these steps, the Solenoid RevCounter is being incremented and checked once per engine revolution such that the air bleed unit may be periodically switched between open and closed states. During the first 40 engine revolutions the air bleed unit is in a fuel enriching closed state, during the following 200 engine revolutions the air bleed unit is in a fuel enleaning open state, and then the cycle repeats itself. After every 16$^{th}$ engine revolution the average speed will be calculated, and for those instances where either the average speed exceeds a predetermined value or the timer has expired, the Warm Up sequence will begin gradually retarding the timing by decreasing the BaseTime value ⅓° per 16 revolutions. This rate of change is less than the rate of change for advancing the BaseTime value. Hence, the ignition timing is advanced (RapidAdvance) at a much faster rate than it is retarded (SlowRetard). Once the BaseTime value has been retarded such that it equals 0 or the current engine speed is greater than a predetermined value, the air bleed unit is opened and the Warm Up sequence is exited. Following the exit of the Warm Up sequence, the Normal Mode sequence begins.

Figures 7C, 7E:
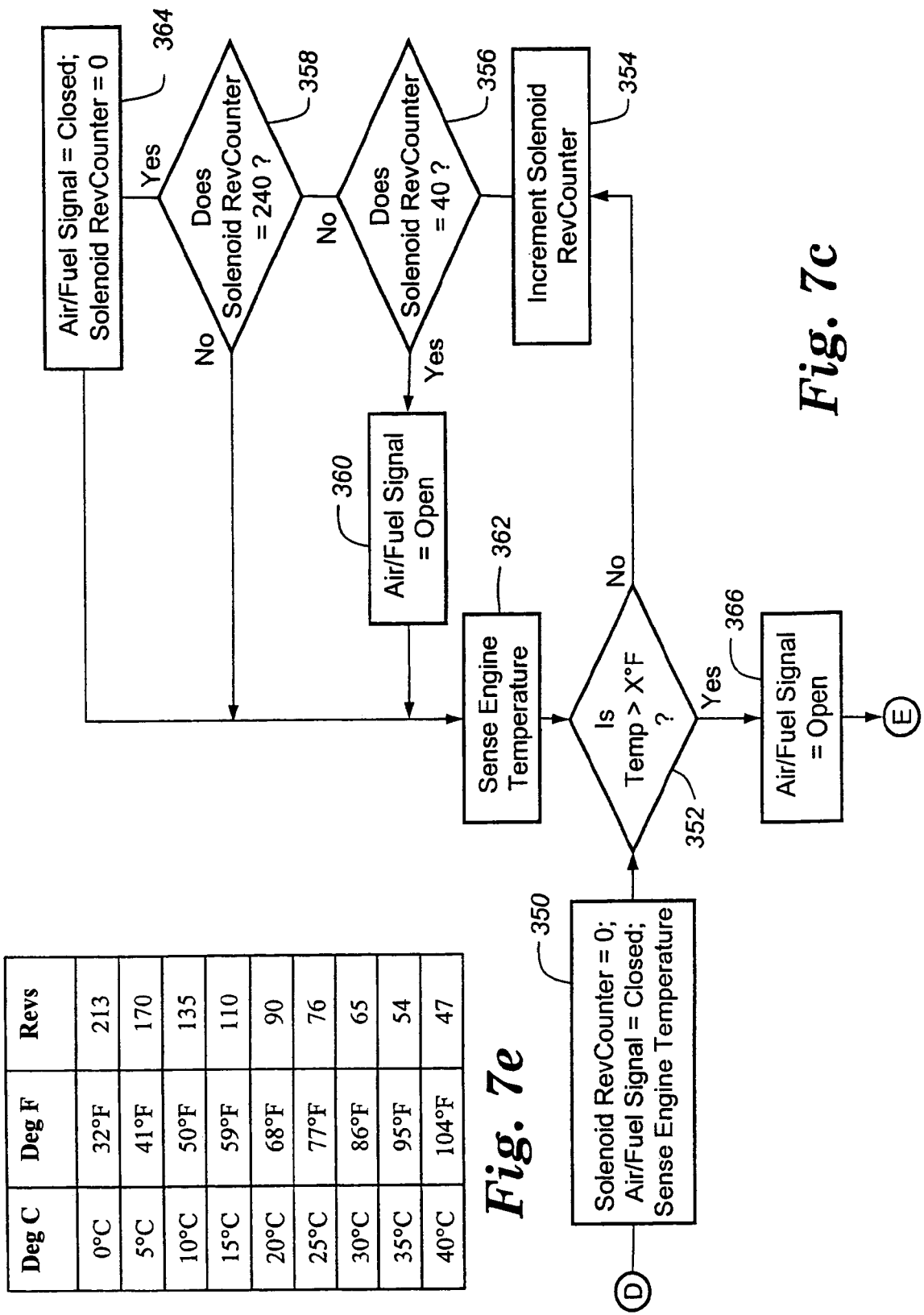
FIGS. 7c–d are flowcharts showing the operational steps of optional temperature dependent sequences that may be used with the Warm Up sequence.
FIG. 7e is an example of a lookup table that may be used with the optional temperature dependent sequence of FIG. 7d.

FIG. 7c shows a first embodiment of an additional, optional section of the Warm Up sequence that may be added in order to take engine temperature into account when controlling the air-to-fuel ratio. This section begins with node D, which is preferably added to the Warm Up sequence between step 308 and the exit. Thus, this section would be executed once the Warm Up sequence is otherwise completed. Step 350 resets Solenoid RevCounter to 0, closes air bleed unit 90 such that the combustible mixture provided by the carburetor is enriched, and takes a sample of the current engine temperature. Referring briefly to FIG. 2, thermistor 73 is a heat dependent resistor connected to pin 4 of microcontroller 60. The thermistor and a standard resistor, also connected to pin 4, act as a voltage divider such that the signal on pin 4 is representative of the temperature dependent resistance of the thermistor, and hence the engine temperature. That temperature signal is used in step 352 of FIG. 7c to determine whether the engine has warmed up enough that it is no longer necessary to operate according to the Warm Up sequence. If the temperature is below a predetermined value, say 125° F., control advances from step 352 to step 354, which increments Solenoid RevCounter. Step 356 then determines if Solenoid RevCounter has reached 40 revolutions. If it has not, control passes to step 358 which determines if the Solenoid RevCounter has reached 240 revolutions. If Solenoid RevCounter has again failed to reach the requisite number of engine revolutions, then control passes to step 362 where a new engine temperature value is sampled for comparison at step 352. Again, as long as the engine temperature remains less than a predetermined amount, the program will cycle through the steps seen in FIG. 7c. Once Solenoid RevCounter reaches 40, step 356 will direct control to step 360 which opens the air bleed unit 90. If Solenoid RevCounter ever reaches 240, then step 364 will close the air bleed unit 90 and reset Solenoid RevCounter such that the process starts over. In this manner, as long as the current engine temperature stays below a predetermined amount, air bleed unit 90 will intermittently open and close, or pulse, with the first 40 engines revolutions occurring with the air bleed unit in a closed position, thus enriching the combustible mixture, and the following 200 engine revolutions occurring with the air bleed unit open such that the combustible mixture is enleaned. At the end of this process, the air bleed unit will again be closed and the cycle will start over. This sequence of instructions occurs until the temperature surpasses a predetermined amount, at which time step 366 opens the air bleed unit and control will pass to node E, which in turn leads to the Warm Up sequence exit and the beginning of the Normal Mode sequence.

Figure 7D:
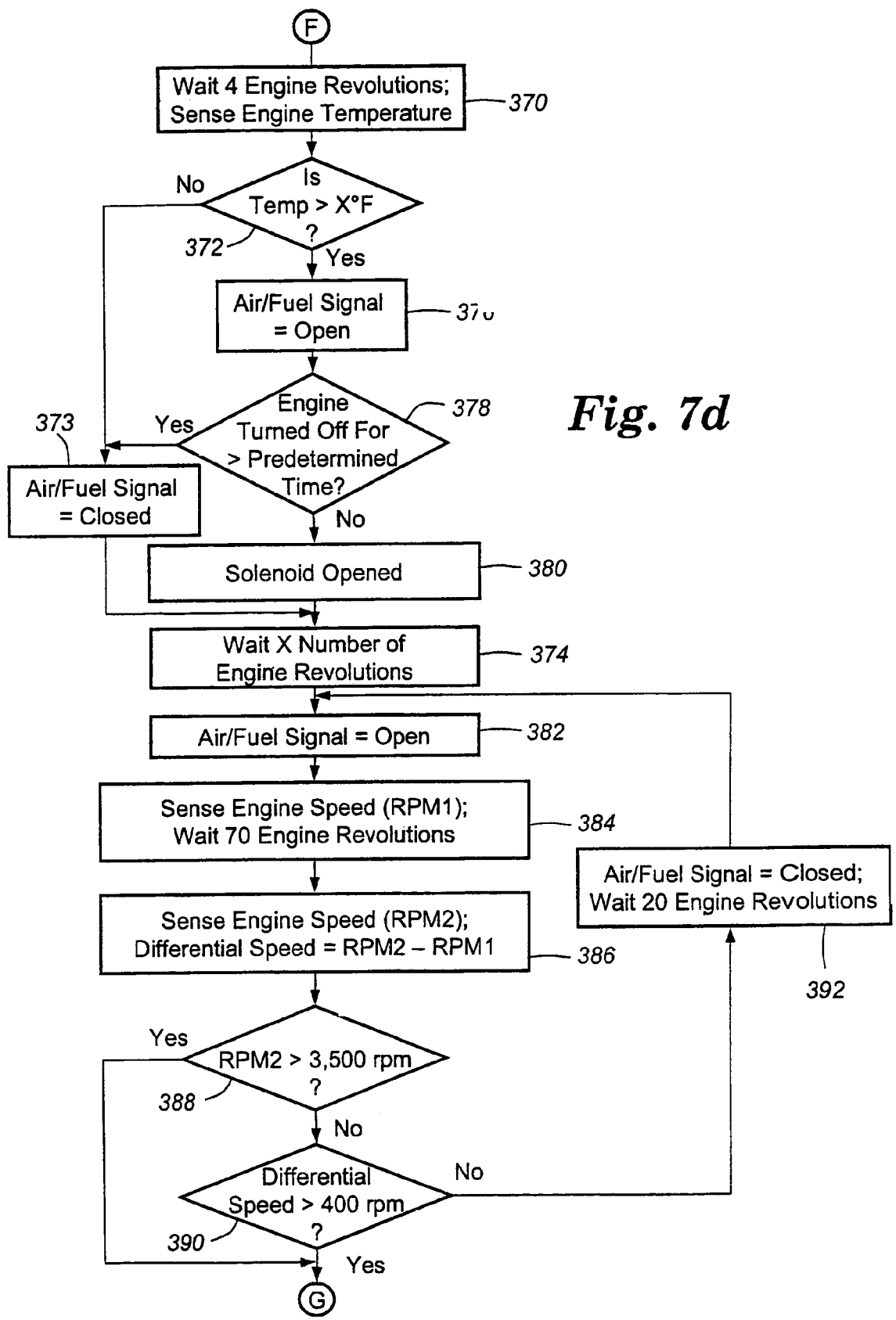

FIG. 7d shows a second embodiment of an additional, optional sequence that may be added to the Warm Up sequence in order to take engine temperature into account when controlling the air-to-fuel ratio. This section begins with node F, which is preferably added to the beginning of the Warm Up sequence before step 300, and is capable of distinguishing between cold and hot starts. By the time the sequence of FIG. 7d is executed, the system normally will have already cycled through the Cranking Sequence of FIG. 6. Step 370 waits four engine revolutions and then senses the engine temperature in a manner similar to steps 350 and 362, as previously explained. With the engine temperature sensed, step 372 compares the sensed temperature to a predetermined temperature, such as 50° F. If the sensed temperature is less than the predetermined temperature, thus indicating a cold start, then step 373 sends a "closed" Air/Fuel signal to solenoid 58. This causes the solenoid to remain closed, thus enriching the combustible mixture, for a certain number of engine revolutions, step 374. The number of engine revolutions can be determined by a temperature-dependent function f(x°), a look up table relating engine temperature to the number of engine revolutions (see FIG. 7e), or any other appropriate temperature vs. engine revolution relationship. FIG. 7e shows an example of a look-up table that could be used with step 374. According to this table, if the sensed engine temperature is 45° F., for example, then the system would cycle through 135 engine revolutions with the solenoid closed before continuing onto the next operating step, as 45° F. falls between 41° F. and 50° F. If step 372 determines that the sensed engine temperature already exceeds the predetermined amount, thus indicating a hot start, then step 376 transmits an "open" Air/Fuel Signal. If the engine has been turned off for longer than some predetermined amount of time, say 30 minutes, then solenoid 58 remains closed. This is because of a resistor (shown in phantom in the circuit of FIG. 2) that is added across capacitor 66 which causes the capacitor to slowly drain over time. If the engine has been off for greater than the predetermined amount of time, then capacitor 66 does not have a sufficient amount of stored energy to change the state of solenoid 58, even though an "open" Air/Fuel Signal is sent. Control of the sequence then passes to step 373, which again makes sure that the solenoid is closed. On the other hand, if the engine has only been off for a few minutes then there remains enough stored energy to change the state of the solenoid in response to the Air/Fuel Signal, step 380. Therefore, in order for the solenoid to be opened in step 380, which enleans the air/fuel mixture, the engine must have a hot enough operating temperature (step 372) AND it must only have been turned off for a short amount of time (step 378). Accordingly, the sequence of FIG. 7d is both temperature and time dependent.

Once the system cycles through the engine revolutions of step 374, step 382 sends an open Air/Fuel Signal that causes the solenoid to open and enlean the combustible mixture. Next, step 384 measures the current engine speed (RPM1) and waits a certain number of engine rotations, say 70 rotations. Step 386 then takes a second engine speed reading (RPM2), and compares the two engine speeds to find a Differential Speed value. If RPM2 is greater than a predetermined engine speed, such as 3500 rpm, then control passes back to the Warm Up Sequence via node G; this is because the engine is already operating at a high enough speed and no longer needs the optional sequence of FIG. 7d. If RPM2 is less than the predetermined engine speed, then the Differential Speed value is compared in step 390. If the engine speed increase between steps 384 and 386 exceeds a certain amount, such as 400 rpm, then the engine is accelerating at a sufficient pace and the optional sequence of FIG. 7d is no longer needed. If the speed differential is less than the predetermined amount, then additional enriching is needed such that control passes to step 392. Step 392 closes the solenoid for enriching purposes and waits a certain number of engine rotations before starting the sequence again at step 382. This sequence of steps continues until control passes to node G, which effectively ends the optional sequence of FIG. 7d. Of course, FIGS. 7c and 7d only demonstrate two possible sequences that may be used with the control system of the present invention, as numerous other embodiments also exist. For example, the sequence of FIG. 7d could be used in lieu of Cranking sequence 102, instead of being added to Warm Up sequence 104.

Figure 8:
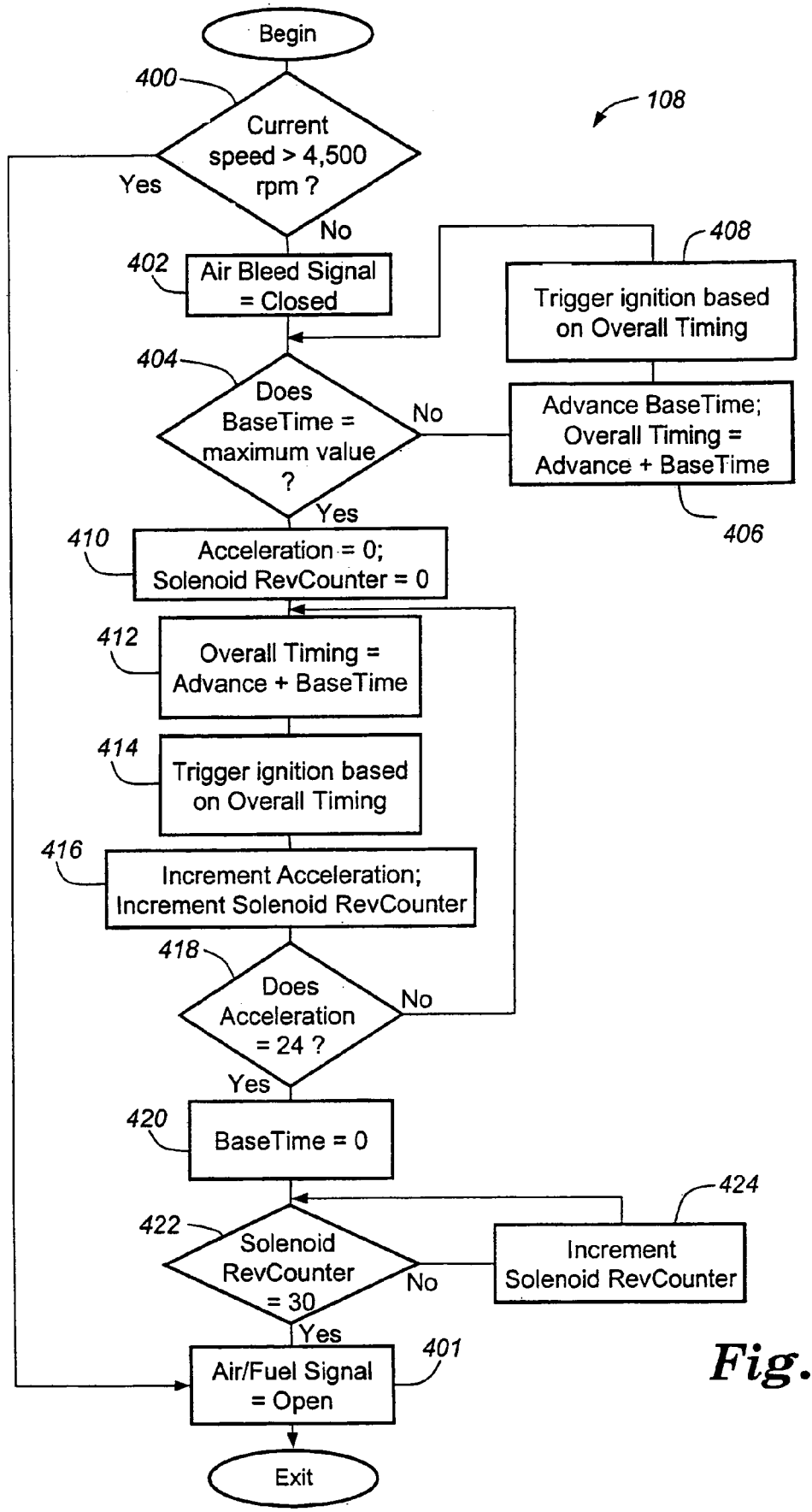
FIG. 8 is a flowchart showing the operational steps of an Acceleration sequence of the control system of the present invention.

Referring now to FIG. 8, Acceleration sequence 108 momentarily advances the ignition timing when the speed of the engine has increased by a predetermined amount over a certain amount of time. The exact value of the acceleration required to trigger this sequence varies depending on the specific engine and application involved, however, in the preferred embodiment the triggering acceleration is a change of 100 RPM within 1 revolution. Decision step 400 begins by determining if the current speed of the engine is greater than 4,500 RPM, and if so, execution of the sequence transfers to Step 401 such that air bleed unit 90 is opened and the Acceleration sequence is exited. If the current engine speed does not exceed 4,500 RPM, then step 402 closes air bleed unit 90, which was open when the Acceleration sequence began, for air-to-fuel ratio enrichment. Decision step 404 determines whether or not the BaseTime value has already reached a predefined maximum value or not, 30° before TDC in the preferred embodiment. If the maximum value has not yet been reached, then step 406 advances the BaseTime value by a predetermined amount, such as 10°, and calculates the Overall Timing value. Following, step 408 triggers an ignition pulse by transmitting an Ignition signal based on the Overall Timing value. This loop will continue until the BaseTime value equals the maximum amount, at which time step 410 is encountered. Step 410 sets each of the counter variables Acceleration and Solenoid RevCounter to zero, such that the ignition is triggered according to the maximum BaseTime value for a certain number of engine revolutions and the air bleed unit 90 remains closed for a predetermined number of revolutions, respectively. Accordingly, steps 412 and 414 calculate the Overall Timing value and send the ignition trigger signal, respectively. Afterwards, step 416 increments the Acceleration value, which is then checked by decision step 418, and the Solenoid RevCounter value. If the Acceleration counter has not yet reached a prescribed amount of revolutions, 24 in the preferred embodiment, then control passes back to step 412, and the Overall Timing value is again determined. Once the counter Acceleration equals 24, step 420 resets BaseTime to 0 and control is passed to decision step 422. At this point, Solenoid RevCounter should have a value equal to the value being compared against in step 418. In the case where it is desirable to keep the combustible mixture enriched for a certain number of engine revolutions beyond the number of engine revolutions during which the ignition timing is advanced, as in the preferred embodiment, step 422 will check Solenoid RevCounter to see if it has reached a predetermined value, such as 30. If Solenoid RevCounter has not reached 30, control is sent to step 424 which increments Solenoid RevCounter and sends control back to step 422. This series of steps continues until Solenoid RevCounter has reached the predetermined number of engine revolutions, at which time the air bleed unit 90 is opened and the Acceleration sequence is exited.

In operation, upon detecting an acceleration over a predetermined amount, the ignition timing will advance immediately, possibly in very quick steps, to a specified ignition timing, where it will remain for a specified number of engine revolutions. Moreover, during that period of rapid acceleration the air bleed unit will be closed for a predetermined number of engine revolutions such that a combustible mixture having an enriched air-to-fuel ratio is supplied by the carburetor to the engine. During steps 404–408, the BaseTime value, and hence the Overall Timing value, will be advanced and an Ignition signal will be sent until the BaseTime value reaches a maximum amount. After this maximum BaseTime value has been achieved, steps 412–418 continue to trigger an ignition pulse at this timing for a predetermined number of engine revolutions. Once the Acceleration counter reaches its limit, the BaseTime value is reset to zero and, depending on whether or not the air bleed unit has been closed for the requisite number of engine revolutions, the air bleed unit is opened and control of the ignition timing passes back to step 130 of the Normal Mode sequence.

Figure 9A:
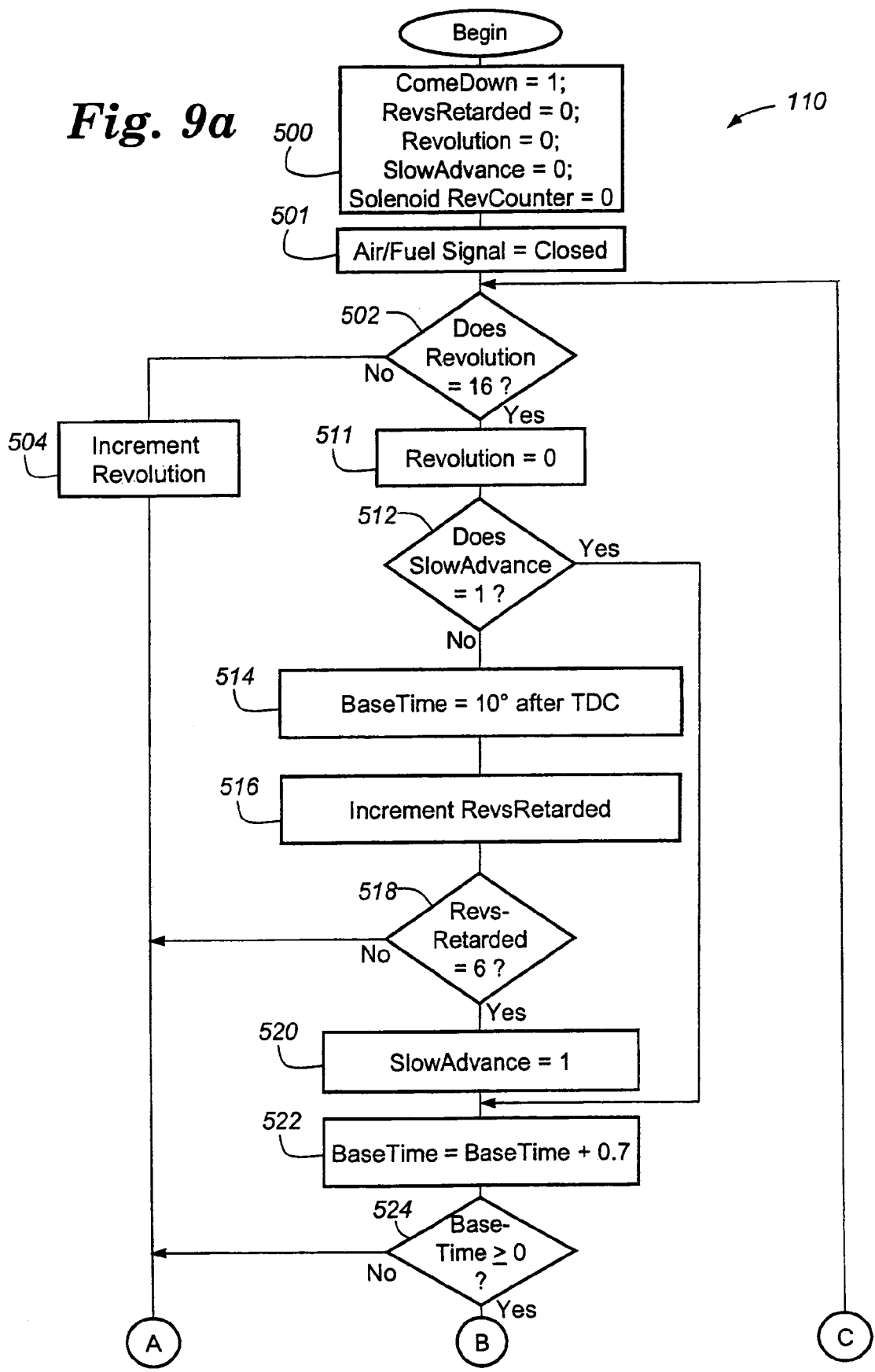
FIGS. 9a–b are flowcharts showing the operational steps of a Come Down sequence of the control system of the present invention.
Figure 9B:
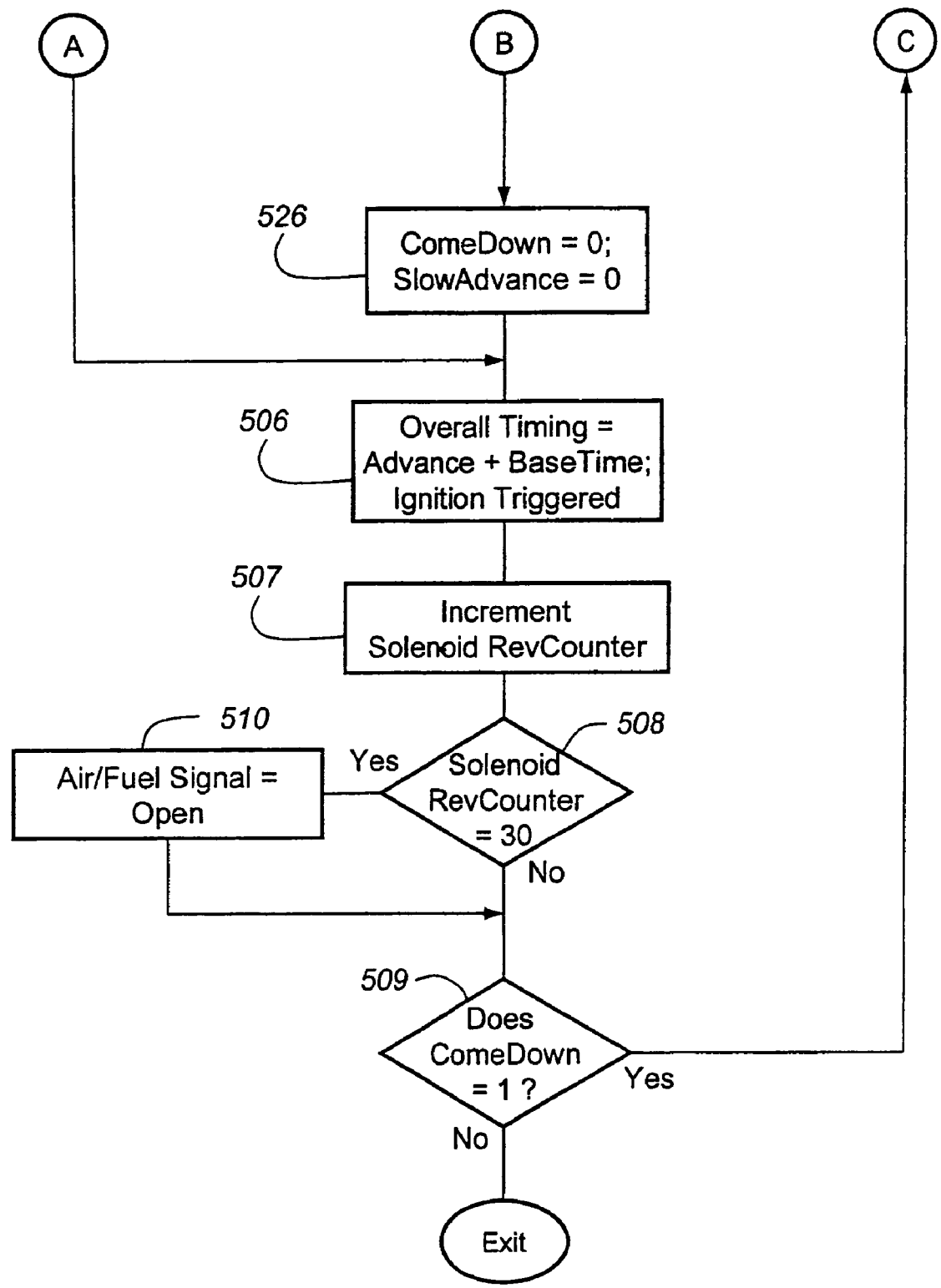

In order to activate the Come Down sequence 110, decision step 126 in FIG. 3 needs to detect a significant drop in engine speed after noting engine speed operation at a heightened level. More specifically, the Come Down sequence is called upon when an engine speed exceeding 6,500 RPMs is sensed, followed by 16 revolutions at a speed below 4,000 RPM. With reference to FIGS. 9a–b, the Come Down sequence is seen in greater detail. When the Come Down sequence is initiated, as when the Acceleration and Recovery Bump sequences are initiated, air bleed unit 90 begins in an open state, which is the typical state used for Normal Mode operation. Step 500 sets the ComeDown flag to 1, the RevsRetarded, Revolution, and Solenoid RevCounter counters to zero, and the SlowAdvance flag to zero. Following the initialization of those variables and flags, step 501 closes air bleed unit 90 in order to enrich the combustible mixture. Next, decision step 502 determines if the Revolution counter has reached 16. If not, step 504 increments Revolution and control is passed to step 506, which determines the Overall Timing value by adding Advance to BaseTime and is seen in FIG. 9b. Since Advance is equal to the value referenced in step 122 of FIG. 3 and BaseTime is equal to zero due to the same step, the Overall Timing value equals the Advance value. Following step 506, Solenoid RevCounter is incremented in step 507 such that step 508 may compare the incremented value to some predetermined value, such as 30 in the preferred embodiment. If Solenoid RevCounter does not equal 30 then control passes to step 509 which checks the ComeDown flag, if Solenoid RevCounter does equal 30 then the air bleed unit 90 is opened and control again flows to step 509. If the ComeDown flag is still 1, as it was set in step 500, then step 509 sends control to step 502 and this cycle continues until the Revolution counter has been incremented to a value of 16.

If the counter Revolution reaches 16, then step 511 resets Revolution to zero, and step 512 checks the SlowAdvance flag. If SlowAdvance equals 0, as it was initially set, then step 514 retards BaseTime to 10° after TDC. Step 516 increments the RevsRetarded counter, which is then checked by decision step 518 to see if the counter equals a predetermined number, 6 in the preferred embodiment. If the answer to step 518 is no, then the Overall Timing is calculated and Ignition pulse triggered according to step 506, as previously explained. Also, Solenoid RevCounter is incremented, checked, and perhaps the air bleed unit opened according to steps 507, 508, and 510, again as already explained. If step 518 determines that RevsRetarded has reached the prescribed limit, then the SlowAdvance flag is set to 1, step 520, and the BaseTime value is increased by 0.7° per 16 revolutions, step 522. Decision step 524 determines if BaseTime is yet greater than or equal to 0 (remembering that thus far in the ComeDown sequence BaseTime has been zero or a negative number since it was retarded). If not, control passes to step 506. If the BaseTime value has already been reduced to zero, then the ComeDown and SlowAdvance flags are set to zero at step 526. This causes the system to exit the Come Down sequence when it reaches step 509, for the Come Down flag no longer equals 1.

In operation, the Come Down sequence is called upon to improve the comedown performance of the engine. Desirable comedown performance is marked by the ability of the engine to return quickly and sharply from higher RPMs to the normal idle RPM without momentarily hanging at a higher RPM (lean comedown) or conversely dipping lower than normal idle RPM (rich comedown). After waiting 16 revolutions, the Come Down sequence retards the BaseTime value to −10° or 10° after TDC, step 514. This negative number will be added to the Advance value to produce the Overall Timing value, thus, a negative BaseTime value retards the Overall Timing. In fact, if the BaseTime value is more negative than the Advance value is positive, then the Overall Timing value will cause the spark plug to fire at some point after TDC. Once retarded, the BaseTime value remains at 10° after TDC until the counter RevRetarded=6, resulting in 96 engine revolutions. Following this period of timing retard, the engine slowly starts advancing 0.7° per 16 revolutions until the BaseTime value is greater than or equal to zero. Concurrently, the Come Down sequence causes the air bleed unit 90 to remain closed for the first 30 engine revolutions, after which the air bleed unit is opened in order to provide a leaner air-to-fuel ratio. Once the BaseTime value is greater than or equal to zero, the ComeDown flag is set to 0 and control of the ignition timing exits the Come Down sequence.

Figure 10A:
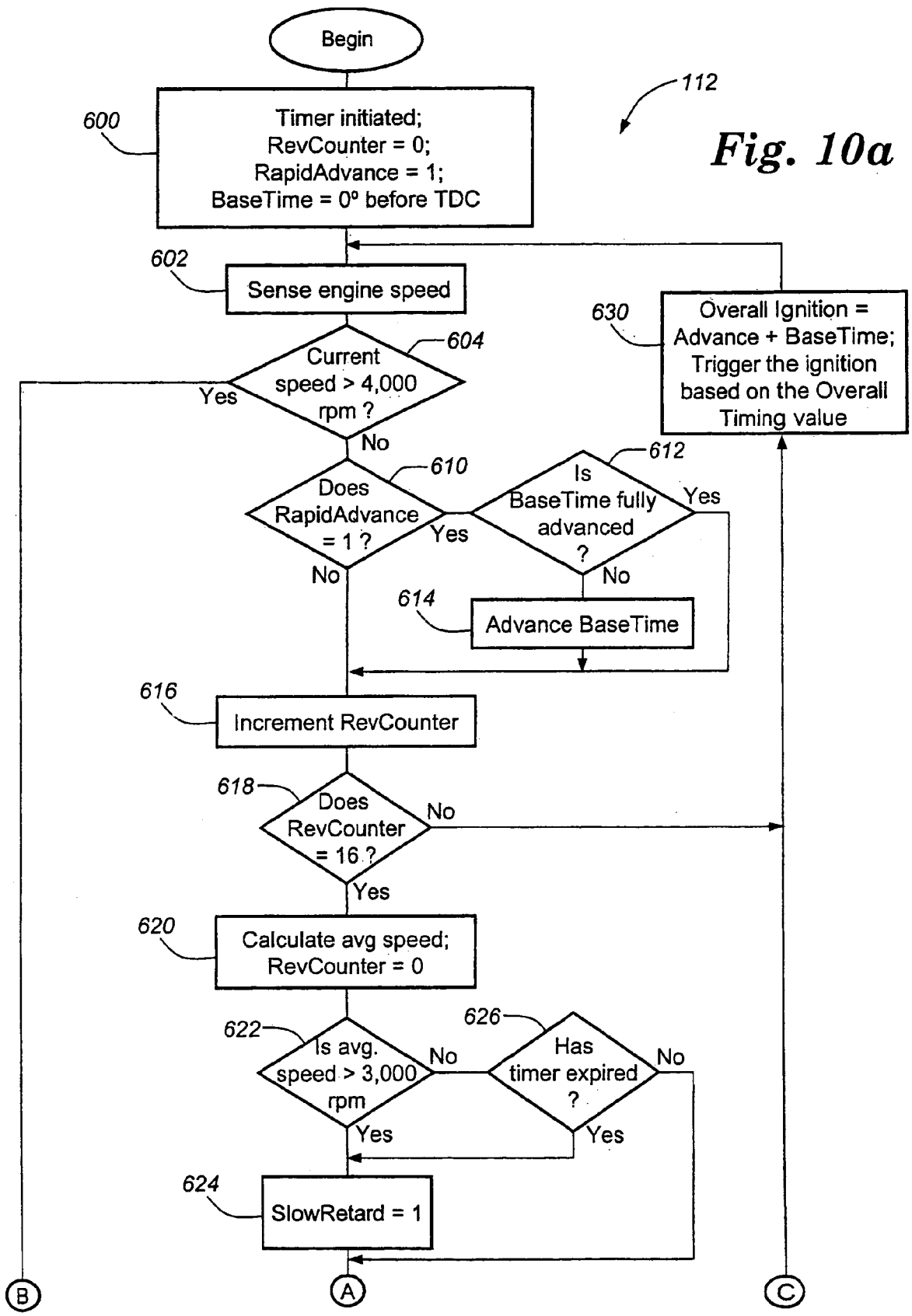
FIGS. 10a–b are flowcharts showing the operational steps of a Recovery Bump sequence of the control system of the present invention.
Figure 10B:
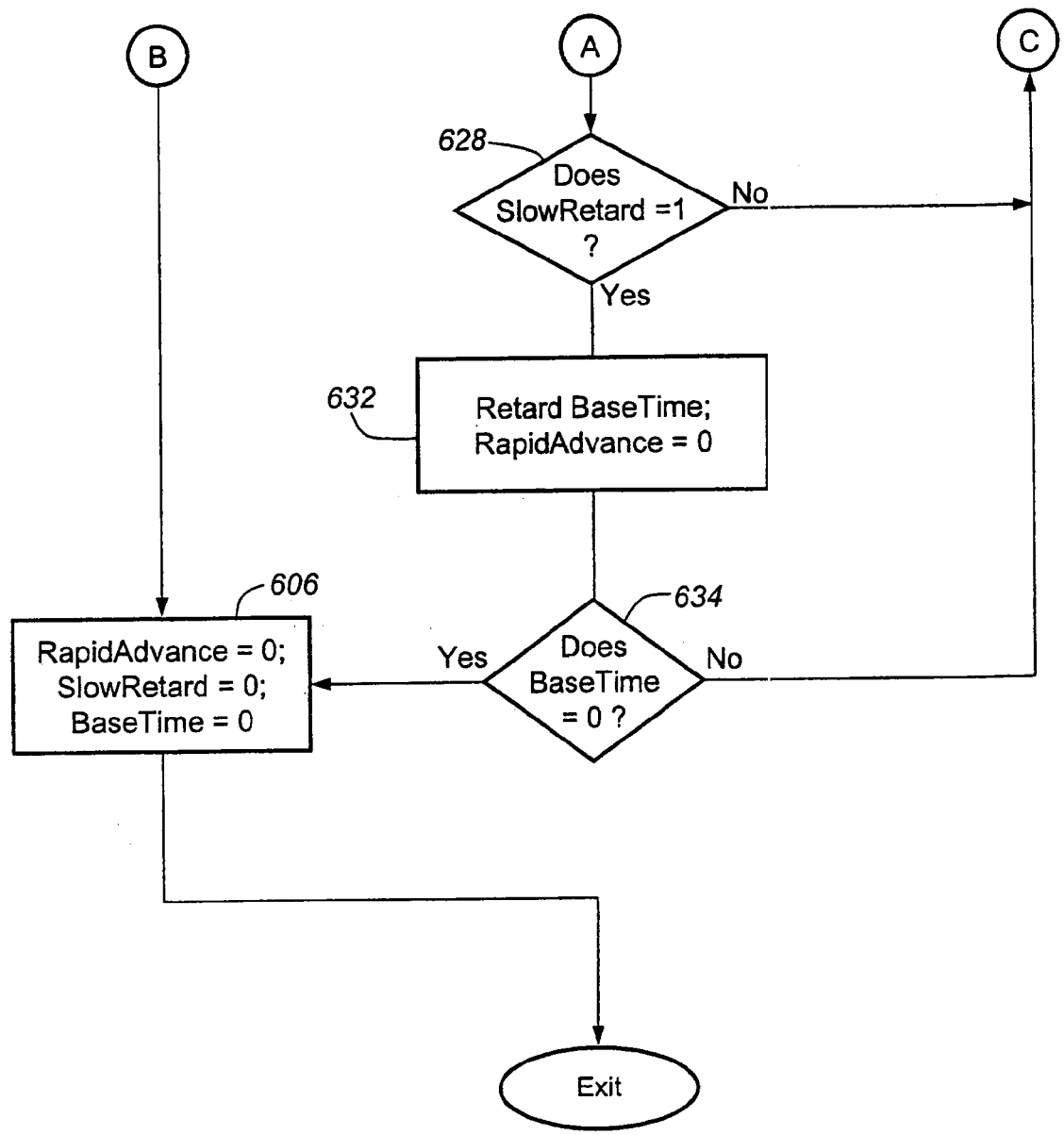

Referring now to FIGS. 10*a*–*b*, there is shown the Recovery Bump sequence 112 which is engaged when Normal Mode operation senses that the current engine speed has fallen below a certain predefined level, namely 2,400 RPMs. The general purpose of the Recovery Bump sequence is to increase the engine speed by temporarily advancing the ignition timing beyond its normal position, thereby decreasing the chance for an engine stall, without altering the air-to-fuel ratio of the combustible mixture. The Recovery Bump sequence is similar in operation to the Warm Up sequence previously described, and begins by initiating a timer, setting the RevCounter variable to zero, setting the RapidAdvance flag to 1, and setting the BaseTime value to 0° before TDC, step 600. When the system enters the Recovery Bump sequence, the air bleed unit 90 is open and remains open for the duration of the sequence, that is the Recovery Bump sequence does not affect the air-to-fuel ratio by controlling latching solenoid 58. Following initialization step 600, step 602 takes a current engine speed sample. If the current engine speed exceeds 4,000 RPM, as determined by decision step 604, the engine speed is already high enough and it is unnecessary to run the Recovery Bump sequence. Accordingly, step 606 resets the RapidAdvance and SlowRetard flags and the BaseTime value to zero. Following this step, control of the ignition timing exits the Recovery Bump sequence. If the current engine speed does not exceed 4,000 RPMs, then decision step 610 checks the RapidAdvance flag. If this flag is 1, which it was initially set to, step 612 checks to see if the BaseTime value has been fully advanced. If not, then 614 advances the BaseTime value by a predetermined amount. If the BaseTime value is already fully advanced, it is undesirable to advance it further. Following these steps, the increment counter seen in step 616 increments RevCounter and then compares that value to 16, or any other predetermined number of engine revolutions. If step 618 determines that RevCounter is less than 16, step 630 calculates the Overall Timing value by adding the Advance value to the current BaseTime value and sends an Ignition signal accordingly. If RevCounter does equal 16, then an average speed is calculated over the last 16 revolutions, step 620, by averaging each of the engine speed values that were sampled in step 602. Also, the RevCounter is set again to zero. If decision step 622 finds that the average speed over those 16 revolutions exceeds 3,000 RPMs, then it is determined that additional timing advance is not needed and step 624 sets the SlowRetard flag is set to 1. If the average speed is under 3,000 RPMs, it is still necessary to check the timer that was initiated in step 600. If decision step 626 determines that the timer has already expired, then the SlowRetard flag is again set to 1, however, if that timer has not yet expired, the SlowRetard flag remains at zero. The status of that flag is checked at 628 and control of the ignition timing is sent to 630 to determine the Overall Timing value. If step 628 finds that the SlowRetard flag has been set, step 632 will retard the BaseTime value and RapidAdvance will be set to zero. Finally, step 634 checks the value of the BaseTime such that if that value has been fully reduced to zero, then the Recovery Bump sequence is exited via step 606. If the BaseTime value has not been reduced to zero, then the Overall Timing value is determined again according to step 630 and control returns to step 602.

In operation, the Recovery Bump sequence adjusts the BaseTime value, thus adjusting the overall ignition timing, until either the current engine speed exceeds a predetermined amount or the BaseTime has been reduced to zero, at which time the sequence is exited and the Normal Mode sequence resumes. As long as the RapidAdvance flag is set to 1 and the BaseTime value is not fully advanced, BaseTime will be advanced ⅓° per revolution of the engine, as seen in step 614. If the BaseTime value becomes fully advanced but the RapidAdvance flag is still set to 1, the Recovery Bump sequence will cycle through steps 602, 604, 610, 612, 616, 618, and 630 until the RevCounter is equal to 16. Every 16th engine revolution the average speed will be calculated, step 620, and for those instances where either the average speed exceeds a predetermined value or the timer has expired, the Recovery Bump sequence will begin gradually retarding the timing by decreasing the BaseTime value ⅓ per 16 revolutions. This rate of retarding is ⅓° per 16 revolutions, where the rate of advancing is ⅓° per revolution. Hence, the ignition timing is advanced (RapidAdvance) at a much faster rate than it is retarded (SlowRetard). Once the Recovery Bump sequence has been exited, the Normal Mode sequence resumes.

The control system previously explained is of an exemplary embodiment, and is intended to include variations which would be obvious to one skilled in the art. For instance, the values for engine speed used to determine the flow of control for the system could be an average engine speed calculated over a predetermined number of engine revolutions instead of a single reading. Thus, before reaching step 124, the Normal Mode sequence could utilize a revolution counter and a loop such that the engine speed is sampled 16 times and averaged. This technique of averaging the engine speed before making comparisons to predetermined values could also be implemented in the Normal Mode sequence before steps 126, 128, or any other applicable area of the present invention. Also, the predetermined engine revolution values used for comparison could be modified to take into account various engine performance, environmental, and other considerations.

Moreover, it is also envisioned that the control system of the present invention could improve the spark energy used for combustion by intelligently eliminating the wasted spark produced by discharging the main capacitor on every flywheel revolution of a 4-stroke engine. By sensing which stroke the engine is on, the ignition timing control could eliminate this wasted spark, thereby doubly charging the main discharge capacitor which could then deliver a higher energy, hotter spark on the power stroke. To accomplish this, the ignition timing control turns off the spark every other revolution for a short period of time, possibly during the Normal Mode sequence following the Warm Up sequence. If the engine speed is not adversely affected by this momentary spark shut-off, the ignition control would know the correct engine stroke had been chosen. If the engine speed does drop, the ignition control would know to turn off the spark to the cycle it did not try. This method of delivering a spark only on the power stroke could be implemented into each of the operating sequences previously described.

Furthermore, a decision step could be added to each of the operating sequences that checks for activation of the kill switch. Instead of waiting for control of the ignition timing to pass to step 134 of the Normal Mode sequence, each operating sequence could include a kill switch monitoring decision step, thus decreasing the amount of time required to recognize kill switch activation.

Also; the spark that initiates the combustion process may be generated by methods other than with a capacitive discharge device. For instance, a "flyback" type ignition system provides a primary winding of a transformer with sufficient current and suddenly halts the current such that the surrounding electromagnetic field collapses, thereby producing a high voltage ignition pulse in the secondary winding.

As previously mentioned, instead of controlling the state of an air bleed solenoid in order to control the air-to-fuel ratio, the system could include a solenoid operated valve that affected the amount of fuel being introduced into the combustible mixture.

It will thus be apparent that there has been provided in accordance with the present invention an ignition timing control system and an air-to-fuel ratio control system for use with a low cost, light duty combustion engine which achieves the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the spirit and scope of the appended claims.

The invention claimed is:

1. A control system for use with a light duty combustion engine, said system comprising:
   an input coupled to an engine speed sensor for receiving an electronic speed signal representative of engine speed,
   a first output coupled to an ignition device for providing that device with an electronic ignition signal that affects the ignition timing of the engine,
   a second output coupled to a valve control device for providing that device with an electronic air/fuel signal that affects the air-to-fuel ratio of a combustible mixture being provided to the engine, and
   an electronic processing device coupled to said input for receiving said speed signal, coupled to said first output for providing said ignition signal, and coupled to said second output for providing said air/fuel signal, wherein said processing device is capable of determining said ignition signal and said air/fuel signal according to an independent operating sequence that is capable of being selected from a plurality of independent operating sequences by utilizing said speed signal.

2. A control system as defined in claim 1, wherein said speed signal, a first charge signal for use with the ignition device, a second charge signal for use with the valve control device, and a power signal for supplying power to said electronic processing device are each provided by windings that are operatively coupled to magnetic sections of an engine flywheel.

3. A control system as defined in claim 2, wherein said ignition signal causes a capacitive discharge of stored energy associated with said first charge signal to a primary ignition winding.

4. A control system as defined in claim 2, wherein said air/fuel signal causes a capacitive discharge of stored energy associated with said second charge signal to a valve actuating solenoid.

5. A control system as defined in claim 1, wherein said valve control device is a latching solenoid that controls the air-to-fuel ratio of the combustible mixture by controlling a carburetor air bleed unit.

6. A control system as defined in claim 1, wherein said electronic processing device is controlled by an independent cranking sequence that is initiated following the starting of the engine and operates for a predetermined number of engine revolutions, and said cranking sequence advances or retards the ignition timing a predetermined number of degrees and controls the air-to-fuel ratio of the combustible mixture.

7. A control system as defined in claim 1, wherein said system includes a second input coupled to an engine temperature sensor for receiving an electronic temperature signal representative of engine temperature, and wherein said temperature signal affects said air/fuel signal.

8. A control system as defined in claim 7, wherein said independent operating sequence comprises a temperature dependent operating sequence, and wherein said temperature dependent operating sequence is capable of affecting said air/fuel signal as long as said temperature signal is greater than a predetermined value.

9. A control system as defined in claim 7, wherein said independent operating sequence comprises a temperature dependent operating sequence, and wherein said temperature dependent operating sequence is capable of affecting said air/fuel signal for a predetermined number of engine revolutions which is dependent upon said temperature signal.

10. A control system as defined in claim 9, wherein said predetermined number of engine revolutions is determined by a lookup table that utilizes said temperature signal.

11. A control system as defined in claim 9, wherein said temperature dependent operating sequence is capable of detecting cold from hot starts.

12. A control system as defined in claim 1, wherein said independent operating sequence is an acceleration sequence that is initiated when said speed signal indicates an engine speed acceleration exceeding a predetermined acceleration, said acceleration sequence is capable of advancing the ignition timing a predetermined number of degrees and maintaining said advancement for a predetermined number of engine revolutions, and is capable of enriching the air-to-fuel ratio of the combustible mixture for a predetermined number of engine revolutions.

13. A control system as defined in claim 1, wherein said independent operating sequence is a come down sequence that is initiated when said speed signal indicates that the engine speed has exceeded a predetermined speed followed by a decrease from said predetermined speed, said come down sequence is capable of advancing or retarding the ignition timing a predetermined number of degrees for a predetermined number of engine revolutions, and is capable of enriching the air-to-fuel ratio of the combustible mixture for a predetermined number of engine revolutions.

14. A control system as defined in claim 1, wherein said independent operating sequence is a recovery bump sequence that is initiated when said speed signal indicates that the engine speed is less than a predetermined speed and is capable of utilizing said speed signal to advance the ignition timing at a first rate and retard the ignition timing at a second rate which is less than said first rate.

15. A control system for use with a light duty combustion engine, said system comprising:
   an input coupled to an engine speed sensor for receiving an electronic speed signal representative of engine speed,
   a first output coupled to an ignition device for providing that device with an electronic ignition signal that affects the ignition timing of the engine,
   a second output coupled to a valve control device for providing that device with an electronic air/fuel signal that affects the air-to-fuel ratio of a combustible mixture being provided to the engine, and
   an electronic processing device coupled to said input for receiving said speed signal, coupled to said first output for providing said ignition signal, and coupled to said second output for providing said air/fuel signal, wherein said processing device is capable of determining said ignition signal and said air/fuel signal according to an independent operating sequence that is capable of being selected by utilizing said speed signal;
   wherein said electronic processing device is controlled by an independent cranking sequence that is initiated following the starting of the engine and operates for a predetermined number of engine revolutions, and said cranking sequence advances or retards the ignition timing a predetermined number of degrees and controls the air-to-fuel ratio of the combustible mixture; and
   wherein said cranking sequence follows a predetermined number of 'no-spark' engine revolutions where said electronic processing device does not provide said ignition signal.

16. A control system for use with a light duty combustion engine, said system comprising:
   an input coupled to an engine speed sensor for receiving an electronic speed signal representative of engine speed,
   a first output coupled to an ignition device for providing that device with an electronic ignition signal that affects the ignition timing of the engine,
   a second output coupled to a valve control device for providing that device with an electronic air/fuel signal that affects the air-to-fuel ratio of a combustible mixture being provided to the engine, and
   an electronic processing device coupled to said input for receiving said speed signal, coupled to said first output for providing said ignition signal, and coupled to said second output for providing said air/fuel signal, wherein said processing device is capable of determining said ignition signal and said air/fuel signal according to an independent operating sequence that is capable of being selected by utilizing said speed signal; and
   wherein said electronic processing device -is controlled by an independent warm up sequence that is initiated shortly after the engine is started, said warm up sequence is capable of utilizing said speed signal to, advance the ignition timing at a first rate and retard the ignition timing at a second rate, and is capable of enriching the air-to-fuel ratio of the combustible mixture for a first number of engine revolutions and enleaning the combustible mixture for a second number of engine revolutions.

17. A control system as defined in claim 16, wherein said system includes a second input coupled to an engine temperature sensor for receiving an electronic temperature signal representative of engine temperature, and said warm up sequence is capable of controlling the air-to-fuel ratio of the combustible mixture for as long as said temperature signal is less than a predetermined value.

18. A control system for use with a light duty combustion engine, said system comprising:
   an input coupled to an engine speed sensor for receiving an electronic speed signal representative of engine speed,
   a first output coupled to an ignition device for providing that device with an electronic ignition signal that affects the ignition timing of the engine,
   a second output coupled to a valve control device for providing that device with an electronic air/fuel signal that affects the air-to-fuel ratio of a combustible mixture being provided to the engine, and
   an electronic processing device coupled to said input for receiving said speed signal, coupled to said first output for providing said ignition signal, and coupled to said second output for providing said air/fuel signal, wherein said processing device is capable of determining said ignition signal and said air/fuel signal according to an independent operating sequence that is capable of being selected by utilizing said speed signal;
   wherein said system includes a second input coupled to an engine temperature sensor for receiving an electronic temperature signal representative of engine temperature, and wherein said temperature signal affects said air/fuel signal;
   wherein said independent operating sequence comprises a temperature dependent operating sequence, and wherein said temperature dependent operating sequence is capable of affecting said air/fuel signal for a predetermined number of engine revolutions which is dependent upon said temperature signal;
   wherein said temperature dependent operating sequence enleans the combustible mixture if: i) said temperature signal exceeds a predetermined temperature, and ii) said control system has been turned off for less than a predetermined amount of time.

19. A control system as defined in claim 18, wherein said predetermined amount of time is determined by a resistor/capacitor (RC) circuit.

20. A method for controlling the ignition timing of a light duty combustion engine, said method comprising the steps of:
   (a) receiving an electronic speed signal representative of engine speed,
   (b) utilizing said speed signal to select from a plurality of independent operating sequences,
   (c) utilizing said selected operating sequence to determine a desired ignition timing value, and
   (d) utilizing said desired ignition timing value to provide an electronic ignition signal to an ignition device, wherein said ignition signal affects the ignition timing of the engine.

21. A method for controlling ignition timing as defined in claim 20, wherein one of said plurality of independent operating sequences includes an acceleration sequence that is initiated when said speed signal indicates an engine speed acceleration exceeding a predetermined acceleration and is capable of advancing the ignition timing a predetermined number of degrees and maintaining the timing at said advanced number of degrees for a predetermined number of engine revolutions.

22. A method for controlling ignition timing as defined in claim 21, wherein said ignition signal is representative of the sum of a first timing value and a second timing value that is determined by said acceleration sequence.

23. A method for controlling ignition timing as defined in claim 22, wherein said control system determines said first timing value by utilizing a look up table relating engine speed to said first timing value.

24. A method for controlling ignition timing as defined in claim 20, wherein one of said plurality of independent operating sequences includes a come down sequence that is initiated when said speed signal indicates that the engine speed has exceeded a predetermined speed followed by a decrease from said predetermined speed, and is capable of advancing or retarding the ignition timing a predetermined number of degrees for a predetermined number of engine revolutions.

25. A method for controlling ignition timing as defined in claim 24, wherein said ignition signal is representative of the sum of a first timing value and a second timing value that is determined by said come down sequence.

26. A method for controlling ignition timing as defined in claim 25, wherein said control system determines said first timing value by utilizing a look up table relating engine speed to said first timing value.

27. A method for controlling ignition timing as defined in claim 20, wherein one of said plurality of independent operating sequences includes a recovery bump sequence that is initiated when said speed signal indicates that the engine speed is less than a predetermined speed and is capable of utilizing said speed signal to advance the ignition timing at a first rate and retard the ignition timing at a second rate which is less than said first rate.

28. A method for controlling ignition timing as defined in claim 27, wherein said ignition signal is representative of the sum of a first timing value and a second timing value that is determined by said recovery bump sequence.

29. A method for controlling ignition timing as defined in claim 28, wherein said control system determines said first timing value by utilizing a look up table relating engine speed to said first timing value.

30. A method for controlling the air-to-fuel ratio of a combustible mixture being provided to a light duty combustion engine, said method comprising the steps of:
(a) receiving an electronic speed signal representative of engine speed,
(b) utilizing said speed signal to select from a plurality of independent operating sequences,
(c) utilizing said selected operating sequence to determine a desired air-to-fuel ratio for the combustible mixture, and
(d) utilizing said desired air-to-fuel ratio to provide an electronic air/fuel signal to a valve control device, wherein said air/fuel signal affects the air-to-fuel ratio of the combustible mixture being provided to the engine.

31. A method for controlling the air-to-fuel ratio as defined in claim 30, wherein one of said plurality of independent operating sequences includes an acceleration sequence that is initiated when said speed signal indicates an engine speed acceleration exceeding a predetermined acceleration and is capable of enriching the air-to-fuel ratio of the combustible mixture for a predetermined number of engine revolutions.

32. A method for controlling the air-to-fuel ratio as defined in claim 30, wherein one of said plurality of independent operating sequences includes a come down sequence that is initiated when said speed signal indicates that the engine speed has exceeded a predetermined speed followed by a decrease from said predetermined speed, and is capable of enriching the air-to-fuel ratio of the combustible mixture for a predetermined number of engine revolutions.

33. A method for controlling the air-to-fuel ratio as defined in claim 30, wherein step (c) further includes utilizing an engine temperature signal to determine said desired air-to-fuel ratio.

34. A control system for use with a light duty combustion engine, said system comprising:
a speed sensor operatively coupled to the engine and having a signal output for providing an electronic speed signal representative of engine speed,
an ignition switch operatively coupled to a capacitive discharge ignition system and having a signal input for receiving an ignition signal capable of affecting the engine ignition timing,
a first air/fuel mixture switch operatively coupled to a solenoid for driving said solenoid in a first direction for enriching a combustible mixture and having a signal input for receiving a first air/fuel signal,
a second air/fuel mixture switch operatively coupled to said solenoid for driving said solenoid in a second direction for enleaning a combustible mixture and having a signal input for receiving a second air/fuel signal, and
an electronic processing device coupled to said speed sensor output for receiving said speed signal, coupled to said ignition switch input for providing said ignition signal, coupled to said first air/fuel mixture switch for providing said first air/fuel signal, and coupled to said second air/fuel mixture switch for providing said second air/fuel signal, wherein said processing device is capable of determining said ignition signal and said first and second air/fuel signals according to an independent operating sequence that is capable of being selected from a plurality of independent operating sequences by utilizing said speed signal.

35. A control system as defined in claim 34, wherein said system further includes a second input capable of receiving a temperature signal representative of engine temperature, said electronic processing device utilizes said temperature signal when determining said air/fuel signal.

36. A control system for controlling both ignition timing and air-to-fuel ratio aspects of a light duty combustion engine, said system comprising:
an input capable of receiving a speed signal representative of engine speed,
an ignition timing output coupled to an ignition device for providing that device with an electronic ignition signal that affects the ignition timing of the engine,
an air-to-fuel ratio output coupled to an electronic valve control device for providing that device with an air/fuel signal that affects the air-to-fuel ratio of a combustible mixture being provided to the engine, and
an electronic processing device that is coupled to said input for receiving said speed signal, coupled to said ignition timing output for providing said ignition signal, and coupled to said air-to-fuel ratio output for providing said air/fuel signal, wherein said processing device is capable of utilizing said speed signal or calculations derived from said speed signal to make a selection between one of several independent operating sequences, wherein said independent operating sequences at least include an acceleration sequence.

* * * * *

UNITED STATES PATENT AND TRADEMARK OFFICE
CERTIFICATE OF CORRECTION

| | | |
|---|---|---|
| PATENT NO. | : 7,000,595 B2 | Page 1 of 1 |
| APPLICATION NO. | : 10/765415 | |
| DATED | : February 21, 2006 | |
| INVENTOR(S) | : Martin N. Andersson et al. | |

It is certified that error appears in the above-identified patent and that said Letters Patent is hereby corrected as shown below:

Column 23
    Line 63, after "to" delete the comma ",",

Signed and Sealed this

Twenty-first Day of November, 2006

JON W. DUDAS
*Director of the United States Patent and Trademark Office*